(12) United States Patent  
Meda et al.

(10) Patent No.: US 12,377,705 B2  
(45) Date of Patent: Aug. 5, 2025

(54) AIR CONDITIONING UNIT

(71) Applicant: Dometic Sweden AB, Solna (SE)

(72) Inventors: Samuele Meda, Chichester (GB); Anton Lundqvist, Älvsjö (SE)

(73) Assignee: Dometic Sweden AB, Solna (SE)

( * ) Notice: Subject to any disclaimer, the term of this patent is extended or adjusted under 35 U.S.C. 154(b) by 198 days.

(21) Appl. No.: 17/998,623

(22) PCT Filed: May 3, 2021

(86) PCT No.: PCT/EP2021/061568  
§ 371 (c)(1),  
(2) Date: Nov. 11, 2022

(87) PCT Pub. No.: WO2021/228601  
PCT Pub. Date: Nov. 18, 2021

(65) Prior Publication Data  
US 2023/0347707 A1    Nov. 2, 2023

(30) Foreign Application Priority Data  
May 15, 2020    (DE) .......................... 102020206181.5

(51) Int. Cl.  
*B60H 1/00* (2006.01)  
*H01Q 1/32* (2006.01)

(52) U.S. Cl.  
CPC ....... *B60H 1/00364* (2013.01); *H01Q 1/3291* (2013.01)

(58) Field of Classification Search  
CPC ...... B60H 1/00364; B60H 2001/00235; H01Q 1/3291; H01Q 1/1221; H01Q 1/22; H01Q 1/3208  
See application file for complete search history.

(56) References Cited

U.S. PATENT DOCUMENTS

D226,381 S    2/1973    Harty, Jr.  
4,051,691 A    10/1977    Dawkins  
(Continued)

FOREIGN PATENT DOCUMENTS

AU    2004202967 B2    12/2010  
AU    2007200788 B2    6/2011  
(Continued)

OTHER PUBLICATIONS

Australia Application No. 202210863 titled "Air Conditioner" filed on Feb. 16, 2022.  
(Continued)

*Primary Examiner* — Kun Kai Ma  
(74) *Attorney, Agent, or Firm* — Dinsmore & Shohl LLP

(57) ABSTRACT

The present invention relates to an air conditioning unit configured to be mounted on a vehicle and being configured such that an antenna connected to an antenna cable can be removably installed in the air conditioning unit and to an air conditioning system for a vehicle comprising the air conditioning unit according to the invention and an air distribution unit that is configured to be mounted internally in the vehicle and to be connected to the air conditioning unit so as to distribute conditioned air from the air conditioning unit inside the vehicle, wherein the air distribution unit is configured to receive the antenna cable.

13 Claims, 20 Drawing Sheets

(56) References Cited

U.S. PATENT DOCUMENTS

| | | |
|---|---|---|
| 4,366,530 A | 12/1982 | Milhous |
| 4,513,809 A | 4/1985 | Schneider et al. |
| D284,025 S | 5/1986 | Armstrong |
| 4,641,502 A | 2/1987 | Aldrich |
| 4,672,818 A | 6/1987 | Roth |
| 4,709,623 A | 12/1987 | Roth et al. |
| D300,777 S | 4/1989 | Bales et al. |
| 4,825,936 A | 5/1989 | Hoagland et al. |
| D306,341 S | 2/1990 | Bales et al. |
| 5,205,130 A | 4/1993 | Pannell |
| 5,423,187 A | 6/1995 | Fournier |
| 5,531,641 A | 7/1996 | Aldrich |
| 5,848,536 A | 12/1998 | Dodge et al. |
| 6,213,197 B1 | 4/2001 | Ebbeson |
| 6,263,689 B1 | 7/2001 | Dodge et al. |
| 6,339,934 B1 | 1/2002 | Yoon |
| 6,357,249 B1 | 3/2002 | Robinson et al. |
| 6,449,973 B2 | 9/2002 | Dodge et al. |
| D469,173 S | 1/2003 | Kawanori et al. |
| 6,595,499 B2 | 7/2003 | Colussi et al. |
| D495,041 S | 8/2004 | Thomas |
| 6,857,953 B2 | 2/2005 | Malott |
| 7,140,192 B2 | 11/2006 | Allen et al. |
| 7,171,822 B2 | 2/2007 | Allen et al. |
| D538,413 S | 3/2007 | Lyu et al. |
| 7,234,315 B2 | 6/2007 | Allen et al. |
| 7,237,397 B2 | 7/2007 | Allen |
| 7,316,119 B2 | 1/2008 | Allen |
| D565,712 S | 4/2008 | Nagahori et al. |
| 7,404,297 B2 | 7/2008 | Chen |
| 7,419,368 B2 | 9/2008 | Milks |
| D588,479 S | 3/2009 | Giese |
| D591,410 S | 4/2009 | Kashimoto |
| 7,739,882 B2 | 6/2010 | Evans et al. |
| D621,492 S | 8/2010 | Tanaka et al. |
| D627,043 S | 11/2010 | Tanaka et al. |
| 7,963,117 B2 | 6/2011 | Allen et al. |
| 8,056,351 B2 | 11/2011 | Marciano et al. |
| D661,386 S | 6/2012 | Bergin |
| D662,472 S | 6/2012 | Tien |
| 8,240,168 B2 | 8/2012 | Holguin |
| 8,347,950 B2 | 1/2013 | Stroobants |
| D680,635 S | 4/2013 | Kashimoto et al. |
| 8,416,101 B2 | 4/2013 | Lee et al. |
| 8,440,143 B2 | 5/2013 | Liptak |
| 8,535,127 B2 | 9/2013 | Malott |
| 8,568,209 B2 | 10/2013 | Boxum |
| D705,917 S | 5/2014 | Hagiwara |
| D708,850 S | 7/2014 | Morine et al. |
| D712,531 S | 9/2014 | Bergin |
| D715,907 S | 10/2014 | Bergin |
| D716,925 S | 11/2014 | Bergin |
| D724,715 S | 3/2015 | Isshiki |
| D755,944 S | 5/2016 | Daniels |
| D759,223 S | 6/2016 | Kosuge |
| D762,528 S | 8/2016 | Allard et al. |
| 9,476,608 B2 | 10/2016 | Yang et al. |
| D770,787 S | 11/2016 | Kim et al. |
| D773,023 S | 11/2016 | Nishiguchi et al. |
| D773,024 S | 11/2016 | Nishiguchi et al. |
| D773,025 S | 11/2016 | Nishiguchi et al. |
| D773,625 S | 12/2016 | Nishiguchi et al. |
| 9,618,260 B2 | 4/2017 | Kang |
| 9,631,832 B2 | 4/2017 | Malott |
| D785,771 S | 5/2017 | Bergin |
| D785,772 S | 5/2017 | Bergin |
| 9,651,284 B2 | 5/2017 | Esch |
| D795,712 S | 8/2017 | Bergin et al. |
| D796,018 S | 8/2017 | Kusuki |
| 9,757,674 B2 | 9/2017 | Kwon et al. |
| D810,251 S | 2/2018 | Yamashita |
| D811,566 S | 2/2018 | Liu et al. |
| D817,466 S | 5/2018 | Moseley |
| 9,975,405 B2 | 5/2018 | Siddiqui et al. |
| D822,190 S | 7/2018 | Niki |
| D822,806 S | 7/2018 | Niki |
| D822,807 S | 7/2018 | Niki |
| D822,808 S | 7/2018 | Niki |
| D822,809 S | 7/2018 | Niki |
| D822,810 S | 7/2018 | Niki |
| D822,811 S | 7/2018 | Niki |
| D824,499 S | 7/2018 | Williamson et al. |
| D827,116 S | 8/2018 | Isshiki |
| 10,082,345 B1 | 9/2018 | Mihail |
| D830,526 S | 10/2018 | Niki |
| D830,527 S | 10/2018 | Niki |
| 10,093,152 B2 | 10/2018 | Allard et al. |
| D832,987 S | 11/2018 | Bergin |
| D838,629 S | 1/2019 | Hinsey et al. |
| D839,139 S | 1/2019 | Hinsey et al. |
| D841,138 S | 2/2019 | Williamson et al. |
| D841,139 S | 2/2019 | Bergin |
| D846,717 S | 4/2019 | Niki |
| D846,718 S | 4/2019 | Niki |
| D846,720 S | 4/2019 | Niki |
| D849,217 S | 5/2019 | Yamashita |
| D850,609 S | 6/2019 | Bergin |
| D862,668 S | 10/2019 | Moseley |
| D865,926 S | 11/2019 | Moseley |
| D879,928 S | 3/2020 | Fujioka et al. |
| 10,589,593 B2 | 3/2020 | Westendarp et al. |
| D882,054 S | 4/2020 | Shiota |
| D883,459 S | 5/2020 | Ishihama et al. |
| D884,870 S | 5/2020 | Bergin |
| 10,675,941 B2 | 6/2020 | Williamson et al. |
| 10,696,129 B2 | 6/2020 | Bergin |
| D905,217 S | 8/2020 | Hederstierna et al. |
| D902,365 S | 11/2020 | Niki |
| D907,183 S | 1/2021 | Meda et al. |
| 10,941,955 B2 | 3/2021 | Heral |
| D915,569 S | 4/2021 | Meda et al. |
| D917,036 S | 4/2021 | Hederstierna et al. |
| 11,027,595 B2 | 6/2021 | Smith et al. |
| 11,034,208 B2 | 6/2021 | Williamson et al. |
| D940,287 S | 1/2022 | Fidler |
| D940,289 S | 1/2022 | Hederstierna et al. |
| D944,374 S | 2/2022 | Hederstierna et al. |
| 11,511,603 B2 | 11/2022 | Bilston et al. |
| D980,410 S | 3/2023 | Kim et al. |
| 11,752,827 B2 | 9/2023 | Meda et al. |
| D1,010,080 S | 1/2024 | Hederstierna et al. |
| 2004/0040325 A1 | 3/2004 | Evans |
| 2004/0219924 A1* | 11/2004 | Flynn ............... H04W 16/00 455/562.1 |
| 2005/0163669 A1 | 7/2005 | Taylor et al. |
| 2006/0016213 A1 | 1/2006 | Al Rashidi |
| 2006/0018807 A1 | 1/2006 | Taylor et al. |
| 2006/0052050 A1 | 3/2006 | Malott et al. |
| 2007/0227693 A1 | 10/2007 | Allen et al. |
| 2008/0202138 A1 | 8/2008 | Pabisz et al. |
| 2009/0209193 A1 | 8/2009 | Kloster et al. |
| 2011/0253847 A1 | 10/2011 | Kataoka |
| 2012/0127050 A1 | 5/2012 | Song |
| 2013/0120972 A1 | 5/2013 | Chung et al. |
| 2013/0205811 A1 | 8/2013 | Esch |
| 2014/0223928 A1 | 8/2014 | Esch |
| 2014/0260393 A1 | 9/2014 | Siddiqui et al. |
| 2017/0079119 A1 | 3/2017 | Horist |
| 2017/0097162 A1 | 4/2017 | Shin et al. |
| 2017/0307242 A1 | 10/2017 | Handsaker et al. |
| 2018/0147913 A1 | 5/2018 | Bergin |
| 2018/0328618 A1 | 11/2018 | Palmer |
| 2019/0047353 A1 | 2/2019 | Williamson et al. |
| 2019/0047354 A1 | 2/2019 | Williamson et al. |
| 2019/0128551 A1 | 5/2019 | Heral |
| 2019/0315197 A1 | 10/2019 | Williamson et al. |
| 2020/0148028 A1 | 5/2020 | Westendarp et al. |
| 2020/0198438 A1 | 6/2020 | Liu et al. |
| 2020/0298655 A1 | 9/2020 | Williamson et al. |
| 2020/0338951 A1 | 10/2020 | Paci et al. |
| 2021/0061054 A1 | 3/2021 | Meda et al. |
| 2021/0061058 A1 | 3/2021 | Meda et al. |
| 2021/0061060 A1 | 3/2021 | Meda et al. |
| 2021/0207882 A1 | 7/2021 | Jurek |

(56) References Cited

U.S. PATENT DOCUMENTS

| | | |
|---|---|---|
| 2021/0239105 A1 | 8/2021 | Allard et al. |
| 2021/0276396 A1 | 9/2021 | Jurek |
| 2021/0354526 A1 | 11/2021 | Williamson et al. |
| 2022/0332170 A1 | 10/2022 | Williamson et al. |
| 2023/0104268 A1 | 4/2023 | Do et al. |
| 2023/0111297 A1 | 4/2023 | Hwang et al. |
| 2023/0347707 A1 | 11/2023 | Meda et al. |
| 2023/0398830 A1 | 12/2023 | Eichorst et al. |

FOREIGN PATENT DOCUMENTS

| | | | | |
|---|---|---|---|---|
| AU | 2007237183 B2 | 9/2012 | | |
| AU | 2009233601 B2 | 9/2012 | | |
| AU | 2007202766 B2 | 8/2013 | | |
| AU | 354553 S | 3/2014 | | |
| AU | 2012261549 B2 | 5/2015 | | |
| AU | 367405 S | 3/2016 | | |
| AU | 201612249 S | 5/2016 | | |
| AU | 201613590 S | 7/2016 | | |
| AU | 201613591 S | 7/2016 | | |
| AU | 201613592 S | 7/2016 | | |
| AU | 201613593 S | 7/2016 | | |
| AU | 2016101949 A4 | 12/2016 | | |
| AU | 2017100215 A4 | 3/2017 | | |
| AU | 201712794 S | 5/2017 | | |
| AU | 201712798 S | 5/2017 | | |
| AU | 2017200186 A1 | 8/2017 | | |
| AU | 201810968 S | 3/2018 | | |
| AU | 201810969 S | 3/2018 | | |
| AU | 201810970 S | 3/2018 | | |
| AU | 201810971 S | 3/2018 | | |
| AU | 201810972 S | 3/2018 | | |
| AU | 201810973 S | 3/2018 | | |
| AU | 201810975 S | 3/2018 | | |
| AU | 201810977 S | 3/2018 | | |
| AU | 201810978 S | 3/2018 | | |
| AU | 201816419 S | 1/2019 | | |
| AU | 201910037 S | 2/2019 | | |
| AU | 201910038 S | 2/2019 | | |
| AU | 201911094 S | 4/2019 | | |
| AU | 201912125 S | 6/2019 | | |
| AU | 2017364256 A1 | 6/2019 | | |
| AU | 2019202512 A1 | 10/2019 | | |
| AU | 201915241 S | 12/2019 | | |
| AU | 201916406 S | 12/2019 | | |
| AU | 201916408 S | 12/2019 | | |
| AU | 201916409 S | 12/2019 | | |
| AU | 2018366469 A1 | 5/2020 | | |
| AU | 202016120 S | 1/2021 | | |
| AU | 202016121 S | 1/2021 | | |
| AU | 202016122 S | 1/2021 | | |
| AU | 202016123 S | 1/2021 | | |
| CA | 2518348 A1 | 3/2006 | | |
| CA | 2578651 A1 | 8/2007 | | |
| CA | 2587994 A1 | 12/2007 | | |
| CA | 2611822 A1 | 5/2008 | | |
| CA | 2686403 A1 | 5/2010 | | |
| CA | 2906348 A1 | 9/2014 | | |
| CA | 2951956 A1 | 12/2015 | | |
| CA | 2954152 A1 | 1/2016 | | |
| CA | 165232 S | 5/2016 | | |
| CA | 165233 S | 5/2016 | | |
| CA | 167431 S | 2/2017 | | |
| CA | 172872 S | 2/2017 | | |
| CA | 172873 S | 2/2017 | | |
| CA | 172874 S | 2/2017 | | |
| CN | 1517608 A | 8/2004 | | |
| CN | 1816459 A | 8/2006 | | |
| CN | 101943449 A | 1/2011 | | |
| CN | 201748561 U | * 2/2011 | | |
| CN | 102265096 A | 11/2011 | | |
| CN | 202546945 U | 11/2012 | | |
| CN | 203083042 U | * 7/2013 | | |
| CN | 103237671 A | 8/2013 | | |
| CN | 103687735 A | 3/2014 | | |
| CN | 204693661 U | 10/2015 | | |
| CN | 105159183 A | * 12/2015 | ......... | G05B 19/0428 |
| CN | 205871826 U | * 1/2017 | | |
| CN | 106470856 A | 3/2017 | | |
| CN | 304097003 S | 4/2017 | | |
| CN | 106976376 A | 7/2017 | | |
| CN | 206493894 U | 9/2017 | | |
| CN | 108790676 A | 11/2018 | | |
| CN | 109070688 A | 12/2018 | | |
| CN | 305029216 S | 2/2019 | | |
| CN | 305029217 S | 2/2019 | | |
| CN | 305029218 S | 2/2019 | | |
| CN | 305105066 S | 4/2019 | | |
| CN | 110126588 A | 8/2019 | | |
| CN | 110217073 A | 9/2019 | | |
| CN | 110293813 A | 10/2019 | | |
| CN | 110385958 A | 10/2019 | | |
| CN | 305397384 S | 10/2019 | | |
| CN | 111344168 A | 6/2020 | | |
| CN | 213237518 U | 5/2021 | | |
| CN | 213237945 U | 5/2021 | | |
| CN | 306672354 S | 7/2021 | | |
| CN | 306681352 S | 7/2021 | | |
| CN | 306901266 S | 10/2021 | | |
| DE | 1472379 A1 | 12/1968 | | |
| DE | 19654261 A1 | 6/1998 | | |
| DE | 19730136 A1 | 1/1999 | | |
| DE | 69503723 T2 | 4/1999 | | |
| DE | 10012157 C1 | 6/2001 | | |
| DE | 20313136 U1 | 11/2003 | | |
| DE | 69817899 T2 | 5/2004 | | |
| DE | 10255833 A1 | 6/2004 | | |
| DE | 10336767 B3 | 12/2004 | | |
| DE | 59812376 | 1/2005 | | |
| DE | 202004007924 U1 | 10/2005 | | |
| DE | 202005013530 U1 | 11/2005 | | |
| DE | 102004032920 A1 | 3/2006 | | |
| DE | 202004017266 U1 | 3/2006 | | |
| DE | 202005000560 U1 | 5/2006 | | |
| DE | 102005030362 B3 | 11/2006 | | |
| DE | 202006001377 U1 | 5/2007 | | |
| DE | 202007003764 U1 | 5/2007 | | |
| DE | 602004004480 T2 | 5/2007 | | |
| DE | 202006001374 U1 | 6/2007 | | |
| DE | 202006001376 U1 | 6/2007 | | |
| DE | 202006009803 U1 | 11/2007 | | |
| DE | 202007006292 U1 | 9/2008 | | |
| DE | 102007038716 A1 | 2/2009 | | |
| DE | 602005012194 A1 | 2/2009 | | |
| DE | 202008003123 U1 | 7/2009 | | |
| DE | 102008028066 A1 | 12/2009 | | |
| DE | 602007009584 | 11/2010 | | |
| DE | 502007006725 | 4/2011 | | |
| DE | 202011101256 U1 | 11/2011 | | |
| DE | 202010012578 U1 | 12/2011 | | |
| DE | 202011002986 U1 | 6/2014 | | |
| DE | 202013004158 U1 | 8/2014 | | |
| DE | 102014200623 A1 | 7/2015 | | |
| DE | 102017116909 A1 | 2/2018 | | |
| DE | 102016220768 A1 | 4/2018 | | |
| DE | 112016004234 T5 | 6/2018 | | |
| DE | 112017000915 T5 | 10/2018 | | |
| DE | 102017207797 A1 | 11/2018 | | |
| DE | 102017214941 A1 | 2/2019 | | |
| DE | 112017005541 T5 | 8/2019 | | |
| DE | 102018204532 A1 | 9/2019 | | |
| DE | 102018206490 A1 | 10/2019 | | |
| DE | 102019205194 A1 | 10/2019 | | |
| DE | 102017219353 B4 | 11/2019 | | |
| DE | 102018206854 A1 | 11/2019 | | |
| DE | 202015009786 U1 | 2/2020 | | |
| DE | 212018000248 U1 | 2/2020 | | |
| DE | 212018000249 U1 | 2/2020 | | |
| DE | 112018003284 T5 | 3/2020 | | |
| DE | 112018003288 T5 | 4/2020 | | |
| DE | 102018222877 A1 | 6/2020 | | |
| DE | 112018005002 T5 | 7/2020 | | |
| DE | 112018005883 T5 | 7/2020 | | |
| DE | 102019212949 A1 | 3/2021 | | |

(56) References Cited

FOREIGN PATENT DOCUMENTS

| | | |
|---|---|---|
| DE | 102020203424 B3 | 7/2021 |
| DE | 112020000265 T5 | 9/2021 |
| DE | 102021208289 A1 | 2/2023 |
| EP | 115674 A2 | 8/1984 |
| EP | 0700801 A1 | 3/1996 |
| EP | 0869018 A2 | 10/1998 |
| EP | 0892225 A2 | 1/1999 |
| EP | 1527919 A1 | 5/2005 |
| EP | 1538009 A1 | 6/2005 |
| EP | 1634740 A1 | 3/2006 |
| EP | 1721765 A1 | 11/2006 |
| EP | 1752717 A1 | 2/2007 |
| EP | 1826041 A1 | 8/2007 |
| EP | 1870270 A1 | 12/2007 |
| EP | 1925889 A2 | 5/2008 |
| EP | 1955946 A2 | 8/2008 |
| EP | 1988612 A2 | 11/2008 |
| EP | 2189312 A1 | 5/2010 |
| EP | 2192040 A1 | 6/2010 |
| EP | 2196390 A1 | 6/2010 |
| EP | 2397787 A2 | 12/2011 |
| EP | 2433658 A1 | 3/2012 |
| EP | 2665611 B1 | 10/2014 |
| EP | 2921792 A1 | 9/2015 |
| EP | 2178710 B1 | 11/2015 |
| EP | 2616258 B1 | 2/2016 |
| EP | 3113965 A1 | 1/2017 |
| EP | 3193096 A1 | 7/2017 |
| EP | 3241695 A3 | 4/2018 |
| EP | 2714440 B1 | 5/2018 |
| EP | 2994326 A1 | 7/2018 |
| EP | 3401619 A1 | 11/2018 |
| EP | 3476630 A1 | 5/2019 |
| EP | 3543047 A1 | 9/2019 |
| EP | 3564564 A1 | 11/2019 |
| EP | 3677459 A1 | 7/2020 |
| EP | 3411250 B1 | 10/2020 |
| EP | 3592585 B8 | 7/2021 |
| EP | 4147892 A1 | 3/2023 |
| JP | H04160905 A * | 6/1992 |
| JP | 2002013761 A * | 1/2002 |
| JP | 201796577 A | 6/2017 |
| JP | 2020199805 A | 12/2020 |
| KR | 20080041058 A * | 5/2008 |
| KR | 20100092070 A | 8/2010 |
| KR | 101445551 B1 | 9/2014 |
| RU | 2753994 C2 | 8/2021 |
| WO | 2004108448 A1 | 12/2004 |
| WO | 2007042065 A1 | 4/2007 |
| WO | 2009021994 A1 | 2/2009 |
| WO | 2009055891 A1 | 5/2009 |
| WO | 2009087094 A1 | 7/2009 |
| WO | 2012034695 A1 | 3/2012 |
| WO | 2012113538 A1 | 8/2012 |
| WO | 2012159749 A1 | 11/2012 |
| WO | 2013082692 A1 | 6/2013 |
| WO | 2014097805 A1 | 6/2014 |
| WO | 2014143181 A1 | 9/2014 |
| WO | 2014180559 A1 | 11/2014 |
| WO | 2016203542 A1 | 12/2016 |
| WO | 2017143393 A1 | 8/2017 |
| WO | 2017143394 A1 | 8/2017 |
| WO | 2017149752 A1 | 9/2017 |
| WO | 2018096127 A1 | 5/2018 |
| WO | 2018162016 A1 | 9/2018 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 A1 | 12/2019 |
| WO | 2020143636 A1 | 7/2020 |
| WO | 2020151541 A1 | 7/2020 |
| WO | 2020188485 A2 | 9/2020 |
| WO | 2020192746 A1 | 10/2020 |
| WO | 2021074841 A1 | 4/2021 |
| WO | 2021186414 A1 | 9/2021 |
| WO | 2023006307 A1 | 2/2023 |

OTHER PUBLICATIONS

Australia Application No. 202210864 titled "Air Conditioner" filed on Feb. 16, 2022.
Australia Application No. 202210865 titled "Air Conditioner" filed on Feb. 16, 2022.
Australia Application No. 202210874 titled "Air Conditioner" filed on Feb. 16, 2022.
Australia Application No. 202210875 titled "Air Conditioner" filed on Feb. 16, 2022.
Australia Application No. 202210876 titled "Air Conditioner" filed on Feb. 16, 2022.
Australia Application No. 202210877 titled "Air Conditioner" filed on Feb. 16, 2022.
Australia Application No. 202210878 titled "Air Conditioner" filed on Feb. 16, 2022.
Australia Application No. 202210879 titled "Air Conditioner" filed on Feb. 16, 2022.
China Application No. 202230072949.8 titled "Rooftop heat exchanger" filed on Feb. 15, 2022.
China Application No. 202230072879.6 titled "Rooftop heat exchanger" filed on Feb. 15, 2022.
China Application No. 202230072942.6 titled "The cover of the heat exchanger" filed on Feb. 15, 2022.
China Application No. 202230073233.X titled "Rooftop heat exchanger" filed on Feb. 15, 2022.
China Application No. 202230073231 titled "Rooftop heat exchanger" filed on Feb. 15, 2022.
China Application No. 202230073218.5 titled "Rooftop heat exchanger" filed on Feb. 15, 2022.
China Application No. 202230073134.1 titled "Rooftop heat exchanger" filed on Feb. 15, 2022.
European Union Application No. 008654404-0001-0004 titled "Rooftop heat exchanger" filed on Aug. 16, 2021.
European Union Application No. 008654396-0001-0006 titled "Shape" filed on Aug. 16, 2021.
Office Action Issued in European Patent Application No. 19759430.2 mailed on Jan. 28, 2022.
Office Action Issued in German Application No. 102021208289 mailed on Feb. 8, 2022.
U.S. Appl. No. 29/826,757 titled "Housing" filed Feb. 15, 2022.
U.S. Appl. No. 62/819,711, filed Mar. 18, 2019 titled "Mobile Air Conditioner".
United Kingdom Application No. 6191825 titled "Ventilation and air conditioning equipment" filed on Feb. 15, 2022.
United Kingdom Application No. 6191826 titled "Ventilation and air conditioning equipment" filed on Feb. 15, 2022.
United Kingdom Application No. 6191827 titled "Ventilation and air conditioning equipment" filed on Feb. 15, 2022.
United Kingdom Application No. 6191828 titled "Ventilation and air conditioning equipment" filed on Feb. 15, 2022.
United Kingdom Application No. 6191837 titled "Ventilation and air conditioning equipment" filed on Feb. 15, 2022.
United Kingdom Application No. 6191838 titled "Ventilation and air conditioning equipment" filed on Feb. 15, 2022.
United Kingdom Application No. 6191839 titled "Ventilation and air conditioning equipment" filed on Feb. 15, 2022.
United Kingdom Application No. 6191840 titled "Ventilation and air conditioning equipment" filed on Feb. 15, 2022.
United Kingdom Application No. 6191841 titled "Ventilation and air conditioning equipment" filed on Feb. 15, 2022.
United Kingdom Application No. 6191842 titled "Ventilation and air conditioning equipment" filed on Feb. 15, 2022.
Design U.S. Appl. No. 29/645,887, filed Apr. 30, 2018 titled "Mobile Air Conditioner".
Design U.S. Appl. No. 29/660,094, filed Aug. 17, 2018 titled "Air Distribution Box".

(56) References Cited

OTHER PUBLICATIONS

U.S. Appl. No. 17/342,723, filed Jun. 9, 2021 titled "Vehicle Air Conditioner".
U.S. Appl. No. 63/141,800, filed Jan. 26, 2021 titled "Air Conditioning System for a Vehicle".
Design U.S. Appl. No. 29/767,929, filed Jan. 26, 2021 titled "Air Conditioner Housing".
Design U.S. Appl. No. 29/774,535, filed Mar. 17, 2021 titled "Air Distribution Box".
U.S. Appl. No. 63/175,304, filed Apr. 15, 2021 titled "Mobile Air Conditioner".
Design U.S. Appl. No. 29/715,592, filed Dec. 3, 2019 titled "Filter Housing".
Design U.S. Appl. No. 29/758,314, filed Nov. 13, 2020 titled "Air Conditioning Apparatus".
Design U.S. Appl. No. 29/760,605, filed Dec. 2, 2020 titled "Air Conditioning Apparatus".
U.S. Appl. No. 62/992,595 entitled "Heating, Ventilation and Air Conditioning System with Illumination" filed Mar. 20, 2020.
U.S. Appl. No. 62/686,217 entitled "Heating, Ventilation and Air Conditioning System with Illumination" filed Jun. 18, 2018.
U.S. Appl. No. 17/252,506 entitled "Heating, Ventilation and Air Conditioning System with Illumination" filed Dec. 15, 2020.
U.S. Appl. No. 17/205,719 entitled "Heating, Ventilation and Air Conditioning System with Illumination" filed Mar. 18, 2021.
Webasto: Rooftop air conditioning systems: Rooftop 3.5-9.9 kw Retrieved from the Internet URL; https://web.archive.org/web/20161201014045/ https://www.webasto.com/au/markets-products/off-highway/air-conditioning/rooftop-air-conditioning/rooftop-ac-35-99- kw, 2 Pages.
Webasto; Truck parking cooler: Cool Top Vario 10 E; Retrieved from the Internet URL, http://www.webasto.com/gb/marketsproducts/truck/air-conditioning/products/cool-top-vario, Apr. 25, 20216, 3 Pages.
Youtube; Viesa Kompressor; Retrieved from the Internet URL, https://www.youtube.com/watch?v=SPK17XEvVL0, May 22, 2012, 3 Pages.
10-Minute Tech, Trailer Life, Jul. 1996, pp. 69-70 dated Jul. 1, 1996.
Office Action Issued in DE Application No. 102023200650.2 mailed on Sep. 25, 2023.
Non-Final issued in U.S. Appl. No. 17/252,506 mailed on Oct. 10, 2023.
Ex-Parte Quayle Action issued in U.S. Appl. No. 29/826,755 mailed on Oct. 10, 2023.
Office Action Issued in DE Application No. 102020206182.3 mailed on Dec. 7, 2023.
Non-Final issued in U.S. Appl. No. 17/205,719 mailed on Nov. 30, 2023.
Office Action issued in CN Application No. 202230073233.X mailed on Dec. 7, 2023.
Office Action issued in CN Application No. 202230073218.5 mailed on Dec. 7, 2023.
Office Action issued in DE Application No. 102020206183.1 mailed on Dec. 7, 2023.
Installation Manual—Brisk II (B57915, B59516, B79516), High Performance (540315, 540316), Blizzard NXT (H540315, H540316), FreshJet (FJX3473, FJX3573), Available Online at:https://www.dometic.com/en-us/outdoor/rv-and-van/rv-air-conditioners, Published Oct. 31, 2023.
Non-Final Office Action issued in U.S. Appl. No. 29/915,796 mailed on Dec. 19, 2023.
Notice of Allowance issued in U.S. Appl. No. 29/915,798 mailed on Jan. 4, 2024.
Notice of Allowance issued in U.S. Appl. No. 29/826,755 mailed on Apr. 15, 2024.
Notification to Grant for Chinese Patent Application No. 202230073233.X mailed on Apr. 23, 2024.
Examination Report issued in AU Application No. 2019291452 mailed on Apr. 26, 2024.
International Search Report and Written Opinion issued in PCT Application No. PCT/EP2024/051551 mailed on May 2, 2024.
Notification to Grant for Chinese Patent Application No. 202230073218.5 mailed on May 11, 2024.
Notification to Grant for Chinese Patent Application No. 201980040452.3 mailed on May 1, 2024.
Final Office Action issued in U.S. Appl. No. 17/252,506 mailed on May 15, 2024.
European Patent Office; International Search Report and Written Opinion issued in PCT App. No. PCT/EP2021/061568, 10 pages, dated Aug. 10, 2021.
European Patent Office; International Search Report and Written Opinion for PCT App. No. PCT/EP2021/061578, 9 pages, dated Aug. 20, 2021.
European Patent Office; International Search Report and Written Opinion issued in PCT App. No. PCT/EP2021/061678, 11 pages, dated Aug. 11, 2021.
Office Action Issued in Chinese Application No. 202230072879.6 mailed on Aug. 8, 2023.
German Patent Application No. 112021000525.1 titled "Heating, Ventilation and Air Conditioning System with Illumination" filed on Sep. 12, 2022.
AU Patent Application No. 2021239071 titled "Heating, Ventilation and Air Conditioning System with Illumination" filed on Jul. 6, 2022.
Office Action issued in German Patent Application No. 112021000525.1 mailed on Oct. 25, 2023.
U.S. Appl. No. 29/915,796 titled "Housing Edge for Air Conditioning Apparatus" filed Nov. 3, 2023.
U.S. Appl. No. 29/915,798 titled "Housing Portion for Air Conditioning Apparatus" filed Nov. 3, 2023.
U.S. Appl. No. 29/915,799 titled "Housing for Air Conditioning Apparatus" filed Nov. 3, 2023.
PCT Application No. PCT/EP2021/061568 entitled "Shape X—Antenna" filed on May 3, 2021.
PCT Application No. PCT/IB2021/052330 entitled "Heating, Ventilation and Air Conditioning System with Illumination" filed on Mar. 19, 2021.
PCT Application No. PCT/EP2021/061578 entitled "Shape X—Upgrade Kit" filed on May 3, 2021.
Notice to Grant Issued in Chinese Application No. 202230073134.1 mailed on Apr. 12, 2022.
Office Action Issued in German Application No. 102021208289 mailed on Jun. 2, 2022.
RecPro RV Air Conditioner 15K Non-Ducted I With Heat Pump for Heating or Cooling Option I RV AC Unit 1 Camper Air Conditioner (Black), https://www.amazon.com/dp/B089MH5WCM/ref=syn_sd_onsite_desktop_41?pd_rd_plhdr=t&th=1, Jun. 4, 2020.
U.S. Appl. No. 29/826,755 titled "Housing" filed Feb. 15, 2022.
PCT Application No. PCT/CN2022/109994 titled "Fresh air intake in AC" filed on Aug. 3, 2022.
PCT Application No. PCT/EP2022/067107 titled "Ventilation Unit and Recreational Vehicle With a Ventilation Unit" filed on Jun. 23, 2022.
Australia Patent Application No. 2021272652 titled "Air conditioning unit" filed on Sep. 27, 2022.
Restriction Requirement issued in U.S. Appl. No. 29/758,314 mailed on Oct. 11, 2022.
Australia Patent Application No. 2021272270 titled "Air conditioning unit" filed on Sep. 27, 2022.
International Search Report and Written Opinion issued in PCT Application No. PCT/EP2022/067107 mailed on Oct. 13, 2022.
International Search Report and Written Opinion issued in PCT Application No. PCT/CN2022/109994 mailed on Nov. 8, 2022.
U.S. Appl. No. 17/998,620 titled "Air Conditioning Unit" filed Nov. 11, 2022.
U.S. Appl. No. 17/998,616 titled "Air Conditioning Unit" filed Nov. 11, 2022.
Chinese Patent Application No. 202180034145.1 titled "Air Conditioning Unit" filed on Nov. 9, 2022.
Chinese Patent Application No. 2021800341470 titled "Air Conditioning Unit" filed on Nov. 9, 2022.

(56) References Cited

OTHER PUBLICATIONS

Chinese Patent Application No. 202180034825.3 titled "Air Conditioning Unit" filed on Nov. 11, 2022.
DE Patent Application No. 102023200650.2 entitled "Ventilating Unit and Recreational Vehicle with a Ventilation Unit" filed on Jan. 26, 2023.
Non-Final issued in U.S. Appl. No. 29/758,314 mailed on Feb. 27, 2023.
"Dometic Freshjet Rooftop Conditioner", Available from Internet, URL: https://www.amazon.com/Dometic-FreshJet-Rooftop-Conditioner-13-5K/dp/B0BGYWF8XS, 2022.
Restriction Requirement issued in U.S. Appl. No. 29/826,755 mailed on May 11, 2023.
Office Action Issued in Chinese Application No. 201980040452.3 mailed on May 20, 2023.
Office Action Issued in Chinese Application No. 202230072879.6 mailed on Jun. 5, 2023.
Office Action Issued in Chinese Application No. 202230073218.5 mailed on Jun. 8, 2023.
Office Action Issued in Chinese Application No. 202230073233.X mailed on Jun. 28, 2023.
Notice of Allowability issued in U.S. Appl. No. 29/758,314 mailed on Jul. 17, 2023.
Office Action Issued in Chinese Application No. 202230072942.6 mailed on Jul. 28, 2023.
Corrected Notice of Allowability issued in U.S. Appl. No. 29/758,314 mailed on Aug. 18, 2023.
American RV Company, Dometic 459530 Duo Therm 13,500 BTU Brisk Air Conditioner High Efficiency Upper Unit Trailer Camper RV, Retrieved from the Internet URL, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV, Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Amazon, Evapolar Personal Air Cooler & Humidifier, Jan. 12, 2017 (retrieved from Internet Sep. 27, 2017).
Australian Patent Application 202016120 entitled "Shape X" filed Nov. 11, 2020.
Australian Patent Application 202016121 entitled "Shape X" filed Nov. 11, 2020.
Australian Patent Application 202016122 entitled "Shape X" filed Nov. 11, 2020.
Australian Patent Application 202016123 entitled "Shape X" filed Nov. 11, 2020.
Australian Patent Application 2019291452 entitled "Lighting and Mobile Air Conditioning Systems with illumination" filed Jun. 17, 2019.
Chinese Patent Application 202030660183.6 entitled "Shape X" filed Nov. 3, 2020.
Chinese Patent Application 202030659749.3 entitled "Shape X" filed Nov. 3, 2020.
Chinese Patent Application 201980040452.3 entitled "Heating, Ventilation and Air Conditioning System with Illumination" filed Jun. 17, 2019.
China Patent Application No. 202110890392.3 entitled "Ventilation and Air Conditioning Arrangement and Recreational Vehicle With a Ventilation and Air Conditioning Arrangement" filed on Aug. 4, 2021.
Dometic Product Catalog—Climate Control. 2015.
Dometic Product Catalog—Climate Control. 2016.
Dirna Bergstrom: Slim Cool; Retrieved from the Internet URL, http://www.dirna.com/files/dirna-manuals/220RE00183.pdf, May 21, 2014, 8 Pages.
Dometic Corporation, Dometic High Performance Air Conditioners, 2 pages, Jan. 1, 2011.
Dometic Duo-Therm, p. 140, Feb. 23, 2013.
Dometic Group: "Climate Control", Retrieved from the Internet URL, http://www.dometic.com/enus/Americas/USA/RV-Products/climate, 5 Pages.
Dometic Waeco Coolair RT 880; Retrieved from the Internet URL, http://www.dometic.co.uk/product/waeco-coolair-rt-880-2/ May 14, 2015.
Dirna Bergstrom: Parking Coolers—No-Idle Electrical A/C—MiniCool Compact 1.4; Retrieved from the Internet URL, http://www.dirna.com/parking-coolers-no-idle-electrical-ac-compact, Mar. 17, 2015, 2 Pages.
DE Patent Application No. 102021208289 entitled "Ventilating Unit and Recreational Vehicle with a Ventilation Unit" filed on Jul. 30, 2021.
Eberspacher Cooltronic Parking Coolers with High Efficiency with the Engine Off; Retrieved from the Internet URL, http://www.eberspacher.com/products/air-conditioning/cooltronic-truck-parking-coolers.html, Jun. 23, 2015, 10 Pages.
European Patent Office, International Search Report and Written Opinion for PCT/IB2019/055060 dated Nov. 28, 2019.
European Patent Application 007942891-0001-0004 entitled "Shape X" filed May 15, 2020.
European Patent Application 19759430.2 entitled "Heating, Ventilation and Air Conditioning System with Illumination" filed on Jun. 17, 2019.
European Union Application No. 008654396-0001-0006 titled "Lighting and Mobile Air Conditioning Systems with illumination" filed on Aug. 16, 2021.
European Union Application No. 008654404-0001-0004 titled "Inventilate—Heat Exchanger" filed on Aug. 16, 2021.
Climate Control IBIS4-IB36H401R1, 1B36H401RIY Air conditioning roof unit Installation Manual, https://epi.dometic.com/externalassets/ibis4-roof-top-adb_9600009482_73658.pdf?ref=2016056866, published on Feb. 20, 2020.
Climate Control—FJX-Dometic FreshJet FJX Short Operating Manual EMEA16, https://manuals.plus/dometic/fix-series-fjx4233m-roof-air-conditioner-manual#axzz7gOSILhRB, Jul. 22, 2022.
Dometic FreshJet FJX4233M, FJX4233M, FJX4233EEH, FJX4333E(EH), FJX7333IHP, FJX7337IHP, FJX7457IHP—Dometic Documents Release Dates, https://documents.dometic.com/search/arabic?query=, Jun. 29, 2022.
International Search Report and Written Opinion Issued for Application No. PCT/IB2021/052330 mailed on Jun. 23, 2021.
International Preliminary Report on Patentability issued for PCT/IB2019/055060 dated Dec. 22, 2020.
Indelb; WO Oblo; Sleeping Well Oblo; Retrieved from the Internet URL, http://www.indelb.com/products/parking_air_cooler/sleeping_well/sw_oblo, Apr. 1, 2016, 2 Pages.
German Patent Application 102020206181.5 entitled "Shape X—Antenna" filed May 15, 2020.
German Patent Application 102020206182.3 entitled "Shape X—Connection Hub" filed May 15, 2020.

(56) References Cited

OTHER PUBLICATIONS

German Patent Application 102020206183.1 entitled "Shape X—Upgrade Kit" filed May 15, 2020.

Kickstarter, Zero Breeze World's Coolest Portable Air Conditioner, Retrieved from the Internet URL, https://www.kickstarter.com/projects/1253665084/zero-breeze-the-worlds-coolest-portable-aircondit Sep. 27, 2017, 32 Pages.

Negative Ion Generators, UV Purification Light; Ultraviolet Air Probe Sanitizer, Feb. 3, 2017 (retrieved from Internet Sep. 27, 2017).

Notification of Registration for European Patent Application No. 007942891-0001-0004 mailed on May 21, 2020.

Notification to Grant for Chinese Patent Application No. 202030659749.3 mailed on Apr. 12, 2021.

Notification to Grant for Chinese Patent Application No. 202030660183.6 mailed on Apr. 13, 2021.

Office Action Issued in DE Patent Application No. 102020206182.3 mailed on May 21, 2021.

Office Action Issued in DE Patent Application No. 102020206183.1 mailed on May 7, 2021.

Office Action Issued in DE Patent Application No. 102020206181.5 mailed on Apr. 16, 2021.

Office Action Issued in China Patent Application No. 202030660183.6 mailed on Feb. 23, 2021.

Office Action Issued in China Patent Application No. 202030659749.3 mailed on Feb. 23, 2021.

PCT Application No. PCT/EP2021/061678 entitled "Shape X—Connection Hub" filed on May 4, 2021.

"Dometic FreshJet 3 Series 15K" Internet URL: https://www.dometic.com/en-us/outdoor/rv-and-van/rv-air-conditioners/dometic-freshjet-3-series-15k-263393, Year:2024.

"Dometic 9600028600 FreshJet 3 Series Standard Profile Mechanical Rooftop Air Conditioner, Cool Only—15,000 BTU, White", Internet URL: https://www.amazon.com/gp/aw/d/B0BGYXRMFM/?th=1, Year: 2024.

"RecPro RV Air Conditioner 13.5K Non-Ducted | Quiet AC | 110-120V | Cooling Only | Easy Install | All-in-One Unit | for Camper, Travel Trailer, Fifth Wheel, Food Trucks, Motor Home (White)", Internet URL: https://www.amazon.com/RecPro-Conditioner-110-120V-Non-Ducted-Installation/dp/B0B22WCYKR/?th=1, Year: 2024.

Restriction Requirement issued in U.S. Appl. No. 29/826,757 mailed on Jan. 19, 2024.

Notice to Grant Issued in Chinese Application No. 202230072942.6 mailed on Dec. 19, 2023.

Office Action issued in DE Application No. 102021208289.0 mailed on Dec. 22, 2023.

Intention to Grant issued in EP Application No. 19759430.2 mailed on Jan. 5, 2024.

Notice to Grant issued in CN Application No. 202230072879.6 mailed on Jan. 3, 2024.

AU Patent Application No. 2022317094 titled "Ventilation unit and recreational vehicle with a ventilation unit" filed on Jan. 23, 2024.

EP Patent Application No. 22734620.2 titled "Ventilation unit and recreational vehicle with a ventilation unit" filed on Feb. 6, 2024.

PCT Application No. PCT/EP2024/051551 titled "Ventilation unit and recreational vehicle with a ventilation unit" filed on Jan. 23, 2024.

U.S. Appl. No. 18/293,054 titled "Ventilation unit and recreational vehicle with a ventilation unit" filed Jan. 29, 2024.

CN Patent Application No. 202280053379.5 titled "Ventilation unit and recreational vehicle with a ventilation unit" filed on Jan. 30, 2024.

Decision to Grant issued in EP Application No. 19759430.2 mailed on Mar. 14, 2024.

Final Office Action issued in U.S. Appl. No. 17/205,719 mailed on Jun. 28, 2024.

Notice of Allowance issued in Design U.S. Appl. No. 29/915,796 mailed on Jul. 15, 2024.

Notice of Allowance issued in Design U.S. Appl. No. 29/915,798 mailed on Jul. 17, 2024.

Corrected Notice of Allowance issued in Design U.S. Appl. No. 29/915,796 mailed on Aug. 5, 2024.

\* cited by examiner

AIR CONDITIONING UNIT

This 35 U.S.C. § 371 National Stage Patent Application claims priority to PCT Patent Application No. PCT/EP2021/061568, filed May 3, 2021, which claims priority to and benefit of DE Patent Application Serial Number 102020206181.5, filed May 15, 2020, all of which is incorporated by reference herein.

The present embodiments relate to an air conditioning unit, in particular to an air conditioning unit as used on the rooftop of a recreational vehicle, to a corresponding air conditioning system that includes the air conditioning unit and to a construction kit for the air conditioning unit and the air conditioning system.

Recreational vehicles are often equipped or retrofitted with additional antennas, for example, with antennas for cellular connections, GPS (Global Positioning System) antennas or WiFi antennas for providing wireless internet access inside the vehicle. Known solutions require to modify or drill holes in the roof of the recreational vehicle in order to install the system. By modifying the roof accordingly, there is an increased risk of water leakage and condensation spreading from the outside to the inside of the vehicle. Further, the antenna system has parts protruding upwards from the top of the roof that consequently require space and are exposed to outside weather conditions.

The present embodiments aim to provide a solution for the above problems, which is based on the general idea to install the antenna, or antenna module inside of an air conditioning unit.

Accordingly, the present embodiments provide as a first aspect an air conditioning unit configured to be mounted on a vehicle, in particular externally on the vehicle, wherein the air conditioning unit is configured such that an antenna connected to an antenna cable can be removably installed in the air conditioning unit.

This provides the possibility for retrofitting the air conditioning unit with an antenna on the user's side as well as to exchange and upgrade the antenna in case of increasing performance of communication technology. Furthermore, no extra space is required for the antenna of the rooftop of the vehicle and the antenna is protected from external conditions.

In accordance with some embodiments, the air conditioning unit comprises a housing that spatially separates an interior of the air conditioning unit from the environment and that the antenna can be arranged inside the housing. The housing is configured so that it can be opened by the user with standard household tools like a screwdriver or the like. As such, the user has an easy access to the inside of the air conditioning unit In accordance with some embodiments, the air conditioning unit comprises a casing inside the housing, the casing forming an air duct serving as at least a portion of a first air circuit inside the air conditioning unit, and the antenna can be arranged between the casing and the housing. As such, a space is provided for the antenna between the housing and the casing. This enables an easy mounting of the antenna as, in the simplest way, the antenna can simply be clamped in-between the housing and the casing.

The casing has an accommodation area for the antenna at an outer surface of the casing. The accommodation area is shaped to match the form of the antenna so as to accommodate the antenna. This further eases the mounting or installation of the antenna. The antenna can simply be put in place in the accommodation area and the housing can be closed thereafter.

Further, the casing has guiding means at an outer surface of the casing for guiding the antenna cable. The guiding means for the cable extends from the accommodation area along the outer surface of the casing. The guiding means have the form of a groove suitable for accommodating the antenna cable.

The material of the casing is not particularly limited. In accordance with some embodiments, however, the casing is formed of a plastic foam material. This results in a relatively low weight. Furthermore, plastic foam materials like expanded polystyrene, expanded polypropylene and similar materials are sufficiently stabile for this purpose. Moreover, plastic foam materials like expanded polystyrene, expanded polypropylene and similar materials have temperature isolating properties, which is particularly advantageous, if the first air circuit is the air circuit for the vehicle interior air. Further, the plastic foam material may include or consist of expanded polypropylene. With expanded polypropylene, a high stiffness can be reached and components made of expanded polypropylene are of high durability. This is advantageous especially for the accommodation area and the guiding means.

In accordance with some embodiments, the air conditioning unit includes the antenna. According to this embodiment, the antenna actually forms part of the air conditioning unit of this embodiment. The air conditioning unit is, however, still configured such that the antenna can be removed and/or replaced by the user.

In a further embodiment of the air conditioning unit including the antenna, the antenna is included in an assembled component that further includes a signal emitter, for example a WiFi-router. In this case, the antenna cable is merely a power cable, since all further necessary electronic components for receiving and emitting electronic signals are arranged in the assembled component that includes the antenna. The assembled component has an enclosure, which makes the assembled component easier to handle as an integral component. Further, the power cable is connected to a power supply inside the air conditioning unit that is configured to supply electrical power to the assembled component. Further, the air conditioning unit comprises a control, for example, a remote control, wherein the antenna and the signal emitter can be controlled by the control of the air conditioning unit.

As a second aspect, the present embodiments provide an air conditioning system for a vehicle comprising the air conditioning unit and an air distribution unit that is configured to be mounted internally in the vehicle and to be connected to the air conditioning unit. With the air distribution unit conditioned air from the air conditioning unit can be distributed inside the vehicle. According to the second aspect, the air distribution unit is configured to receive the antenna cable. The antenna cable is accessible for the user from inside the vehicle with standard household tools like a screwdriver or the like. As such, the user has an easy access to the antenna cable.

In accordance with some embodiments, the air distribution unit comprises a mounting area for mounting a signal emitter, for example a WiFi-router and/or other suitable components. The air distribution unit is configured such that the signal emitter can be connected with the antenna cable. Thus, especially the signal emitter can be easily mounted from inside the vehicle providing the signals of the antenna inside the vehicle. The mounting area comprises snap-in elements by which the signal emitter can be mounted to the mounting area. As such, the signal emitter can simply be clicked in place at the air distribution unit.

The air distribution unit comprises a removable cover covering the mounting area. This allows the signal emitter including the appropriate cabling to be mounted out of sight of the user.

In accordance with some embodiments, the air conditioning system includes the signal emitter. Now, the signal emitter actually forms part of the system, but the air distribution unit is still configured such that the signal emitter can be removed and/or replaced by the user.

In accordance with some embodiments of the air conditioning system, in a mounted state, the air conditioning unit is connected to a power supply, wherein the antenna and the signal emitter can be connected to the power supply of the air conditioning unit as well. This enables easy plug-and-play.

In accordance with some embodiments, the air conditioning system comprises a control, wherein the antenna and the signal emitter can be controlled by the control of the air conditioning system. This streamlines the operation since less control devices like remote controls are necessary.

As a third aspect, the present embodiments provide a construction kit including an antenna and an antenna cable which are configured for being installed in the air conditioning unit or the air conditioning system. With the construction kit, the air conditioning unit and the air conditioning system can be easily upgraded. For example, the construction kit further includes a signal emitter, for example a WiFi-router, that is configured to be mounted inside the air distribution unit of the air conditioning system of the present embodiments.

The present embodiments will be further explained in the following by use of the exemplary embodiments illustrated in the accompanying drawings, in which FIG. 1 shows an embodiment of the air conditioning unit from several different perspectives;

FIG. 14 shows a perspective view of the air conditioning unit as assembled in

Figure 2:
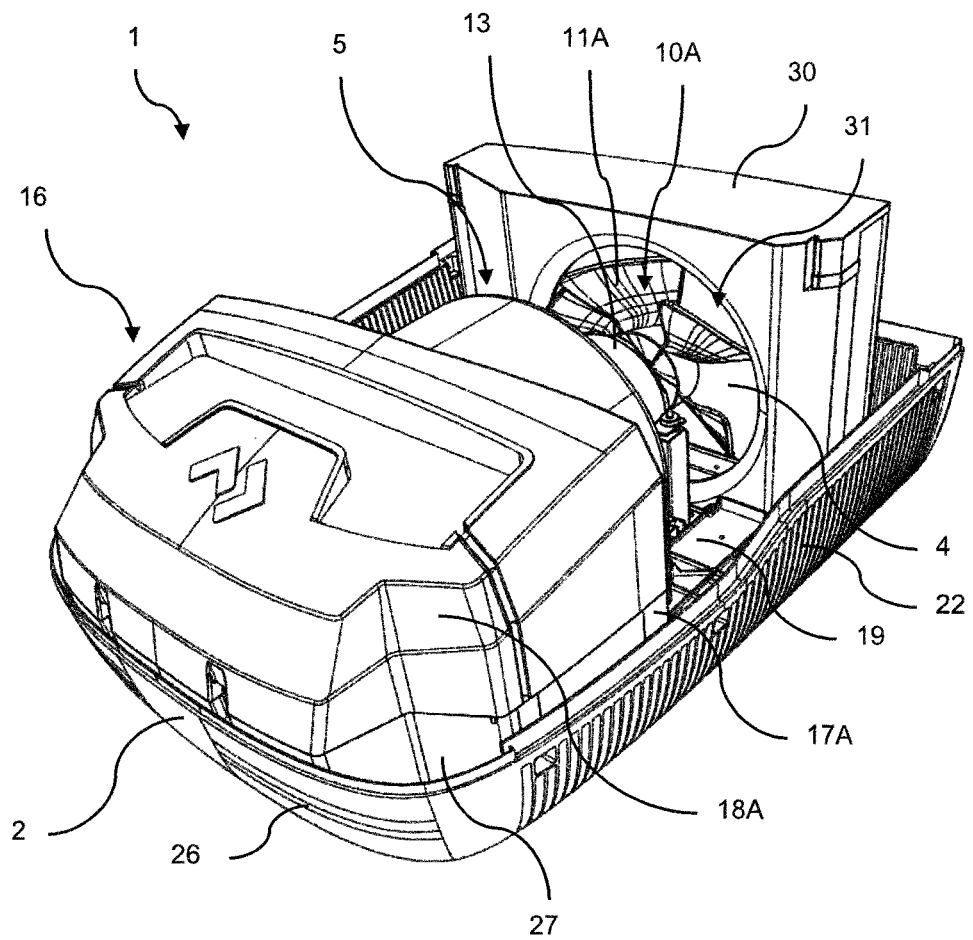
FIG. 2 shows a perspective view of a first embodiment of the air conditioning unit with open housing.
Figure 14:
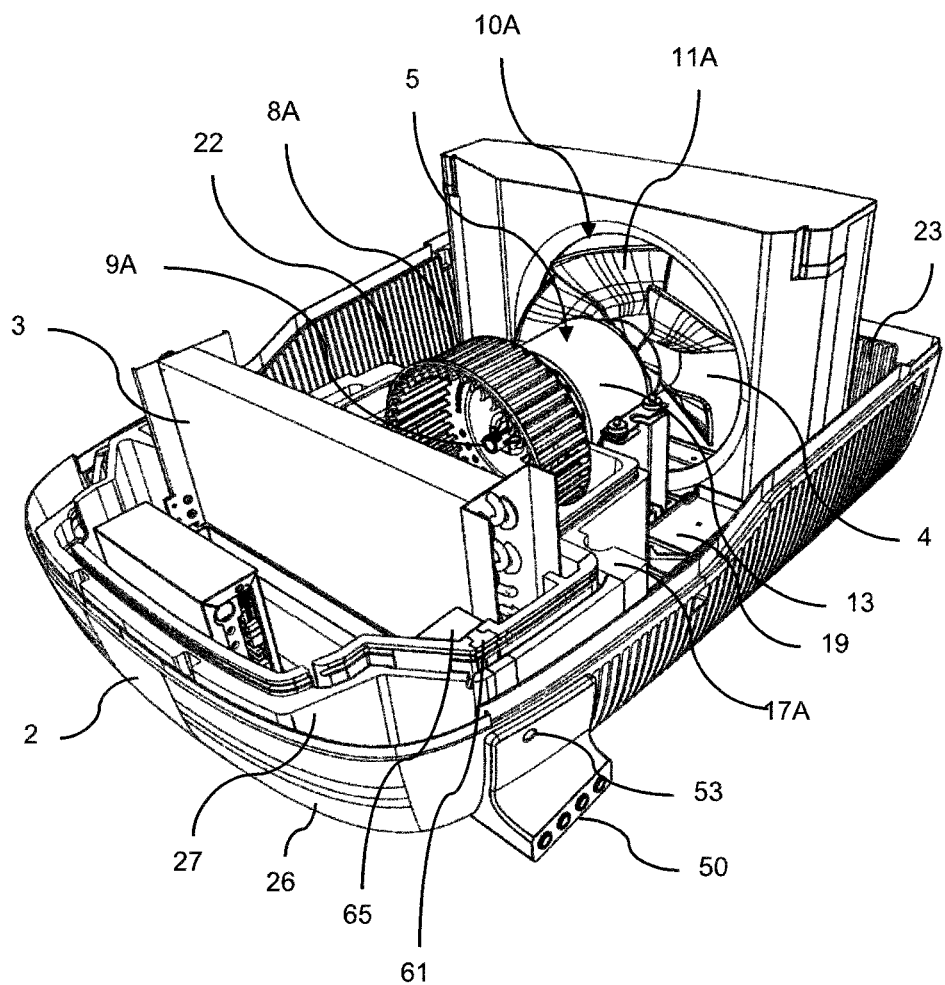
Figure 15:
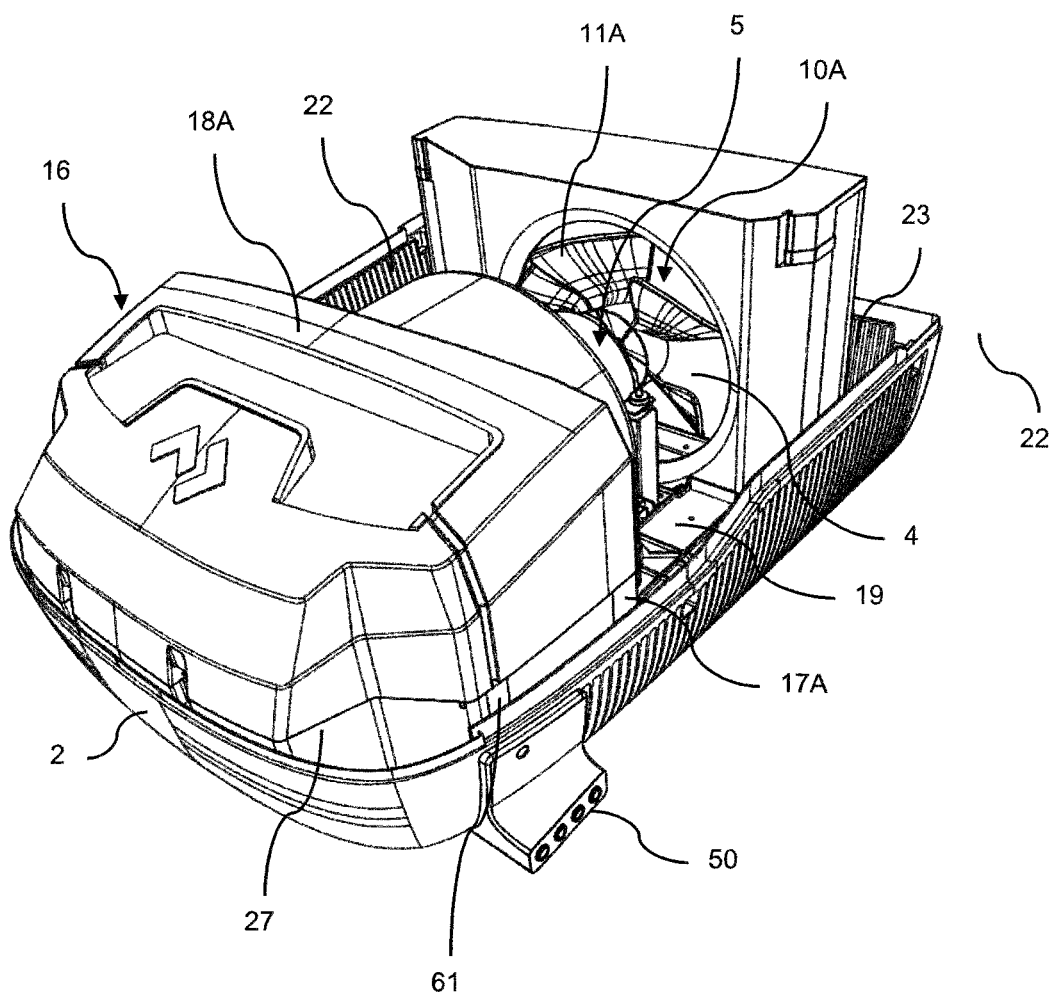
Figure 16:
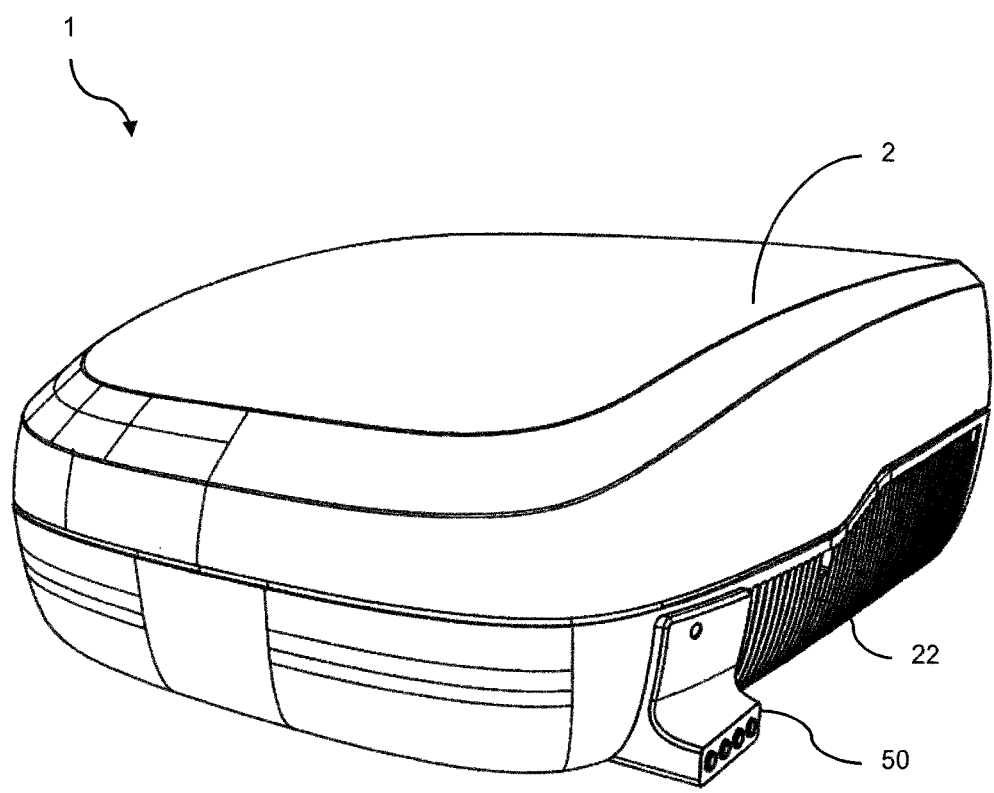
Figure 17:
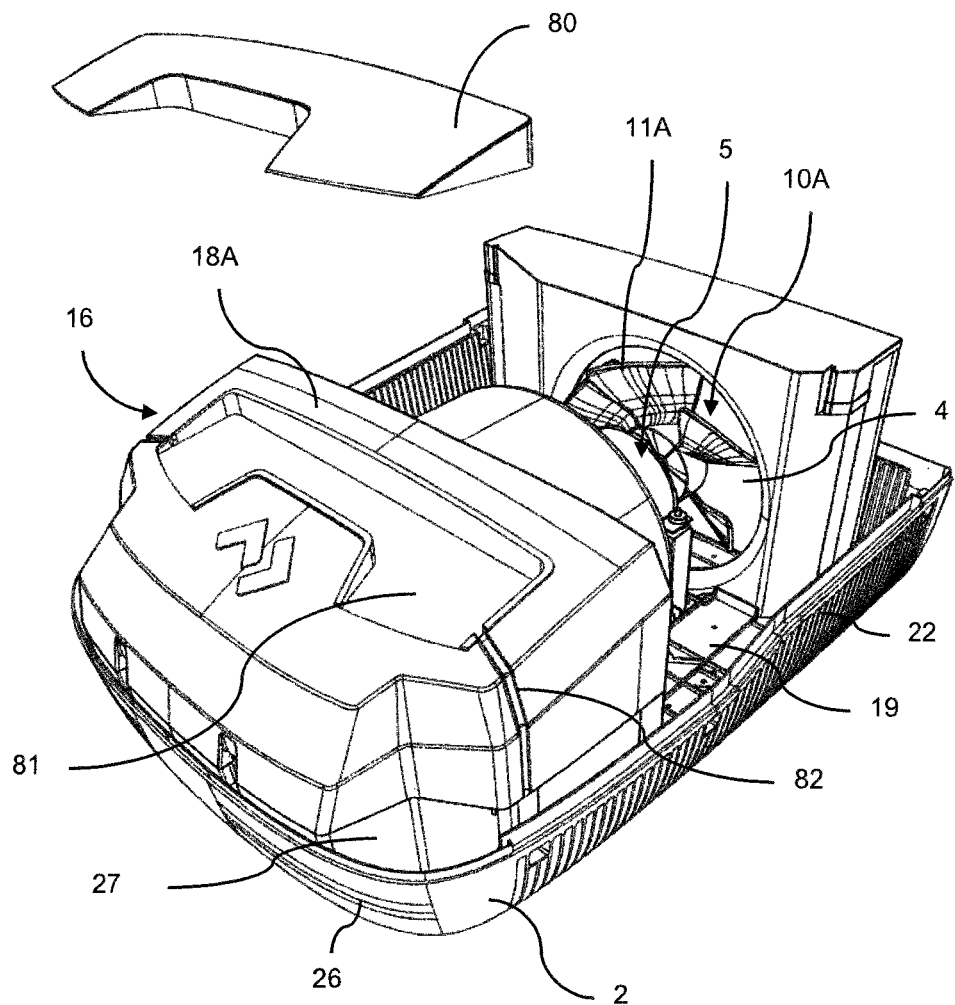
Figure 18:
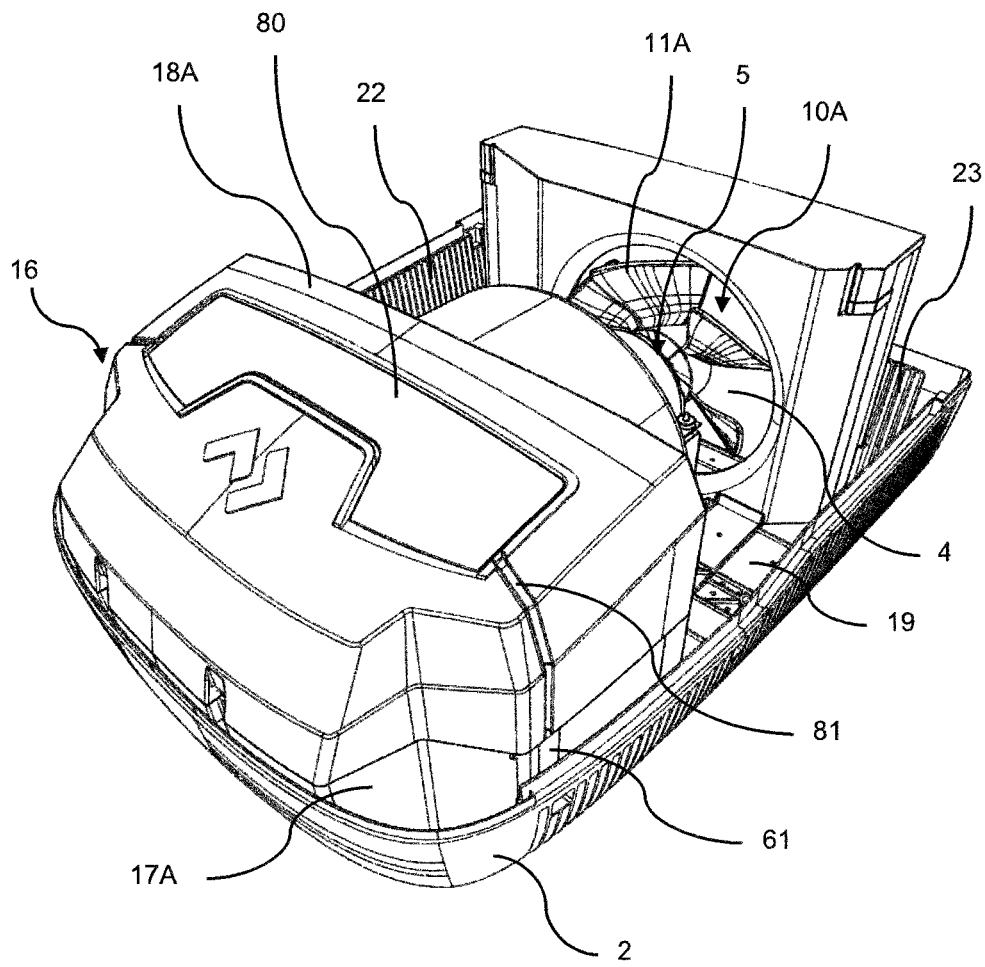
Figure 19:
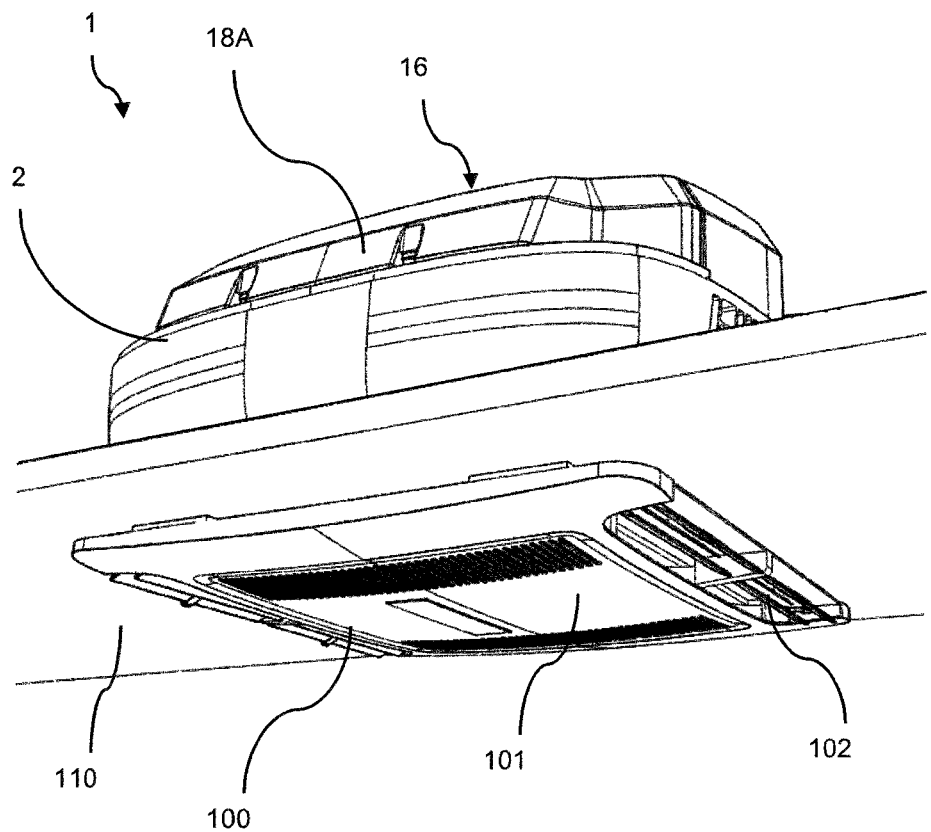
Figure 20:
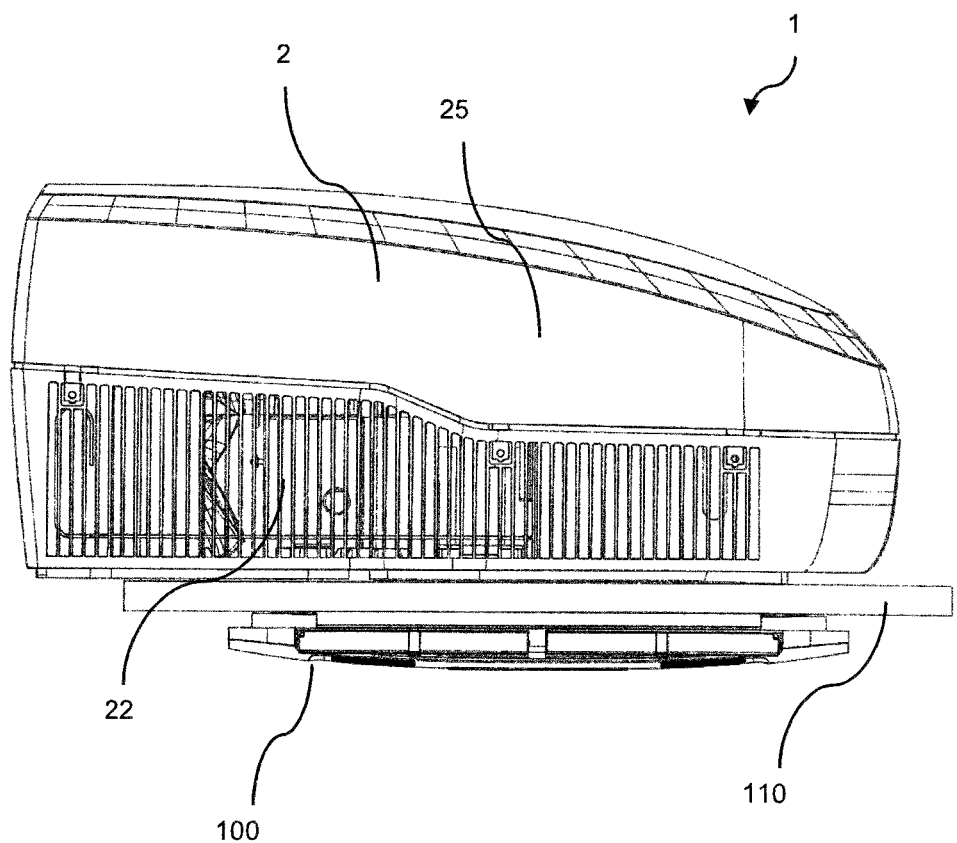

FIG. 13;

FIG. 15 shows a perspective view of the air conditioning unit of FIG. 14 with the molded cover part;

FIG. 16 shows a perspective view of the air conditioning unit of FIG. 15 with closed housing;

FIG. 17 shows an exploded view of the air conditioning unit shown in FIG. 2 with an antenna;

FIG. 18 shows the air conditioning unit of FIG. 17 with the antenna in place;

FIG. 19 shows a perspective view of an embodiment of the air conditioning system mounted on a roof of a vehicle; and FIG. 20 a side view of the mounted air conditioning system shown in FIG. 19.

Identical components of the first and second embodiment of the air conditioning unit are assigned identical reference numbers in the drawings and in the following detailed description. The reference numbers of corresponding components of the first and second embodiment of the air conditioning unit that, however, differ from each other in the specific design are additionally marked with the letters A and B, wherein "A" refers to the first embodiment and "B" refers to the second embodiment of the air conditioning unit.

In the framework of the present embodiments, terms relating to an orientation or direction like, for example, front, rear, side, bottom, top and the like refer to the air conditioning unit or system when mounted on the rooftop of a vehicle and with respect to the travelling direction of the vehicle, unless explicitly mentioned otherwise.

Figure 1:
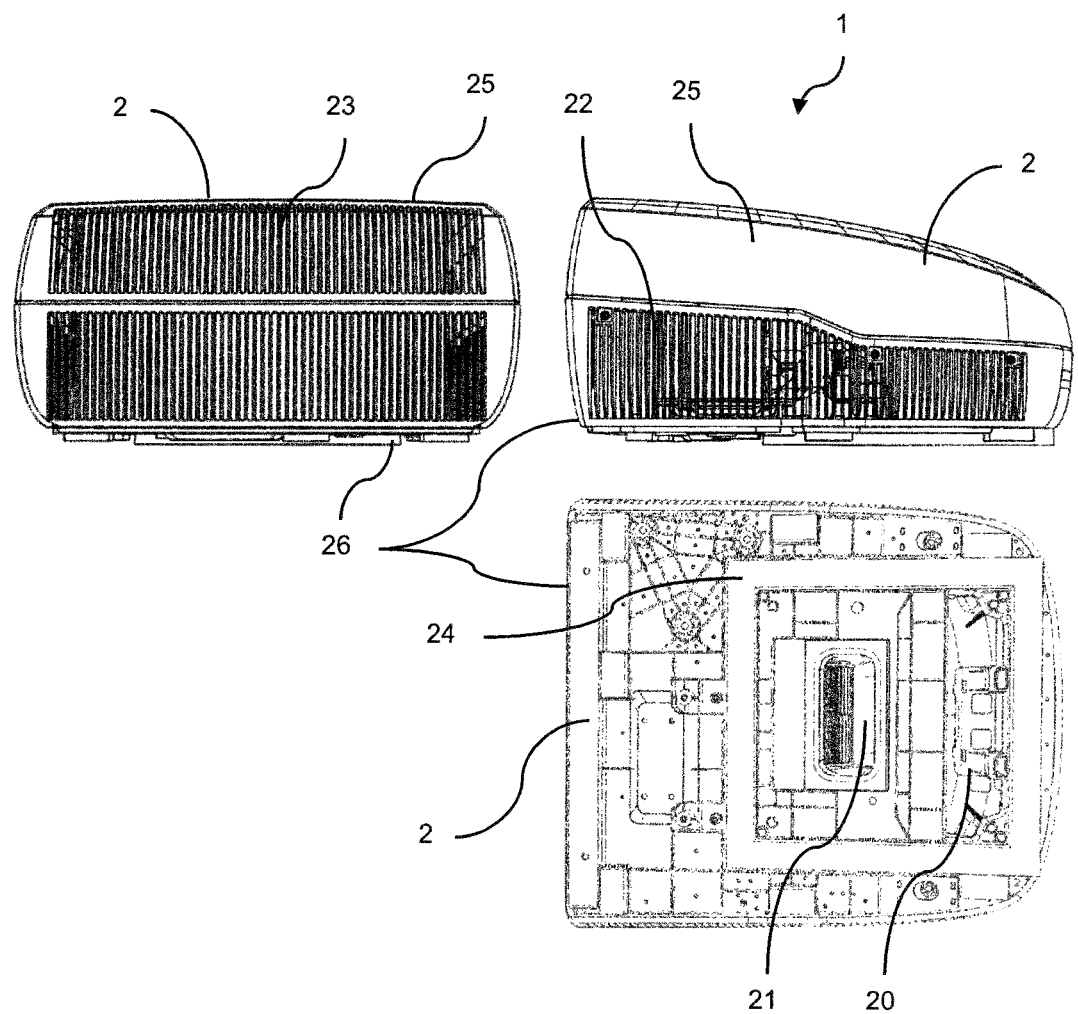

FIG. 1 shows the outer appearance of the air conditioning unit 1 from behind (upper left drawing), from the side (upper right drawing) and from below (lower right drawing). Practically, the entire air conditioning unit 1 is covered by the housing 2. The housing 2 has two parts, wherein the upper part being the lid part 25 that can be removed for opening the air conditioning unit 1, also in a mounted state, for example on the roof 110 of the vehicle, as shown in FIG. 19. The lower part of the housing 2 is the base part 26 in which most of the interior components of the air conditioning unit 1 are arranged.

As it is typical for such air conditioning units, two separated air circuits are formed inside the air conditioning unit 1, an interior vehicle air circuit and an ambient air circuit. In the framework of the present embodiments, the air circuit of the vehicle interior air is designated as the first air circuit and the air circuit of the ambient air is designated as the second air circuit.

For the first air circuit, the air conditioning unit 1 has on its underside a first opening 20 and a second opening 21. The first opening 20 serves as the inlet of the vehicle interior air. The second opening 21 serves as the outlet of conditioned air that is to be fed back into the interior of the vehicle. Thereby, the connection area 24 provides for a sealed connection between the air conditioning unit 1 and the roof 110. For a proper distribution of conditioned air inside the vehicle the first opening 20 and the second opening 21 are coupled with the air distribution unit 100 which is mounted inside the vehicle, as it will be explained in further detail below with reference to FIGS. 19 and 20.

For the second air circuit, the air conditioning unit 1 has on its sides first air vents 22. The first air vents 22 serve as the inlet for ambient air. Second air vents 23 are located on the back side of the air conditioning unit 1. The second air vents 23 serve as the ambient air outlet.

FIG. 2 shows the first embodiment of the air conditioning unit 1 with the lid part 25 of the housing 2 being removed. The first embodiment of the air conditioning unit 1 includes the specific fan arrangement 5 (first fan arrangement). The first fan arrangement 5 is essentially composed of a common motor 13 that drives two fans, one for each of the first air circuit and the second air circuit.

On the base portion 19 inside the air conditioning unit 1, a casing 16 is arranged. The casing 16 forms an air duct inside serving as a portion of the first air circuit. The casing 16 is formed of expanded polypropylene which has good temperature isolating properties and is a very light-weight material. The casing 16 is composed of three molded parts, namely the first molded part 17A, the second molded part 18A and the third molded part 27. The casing 16 is arranged at the front side of the air conditioning unit 1. The second molded part 18A and the first molded part 17A are held together and in place by the housing 2. In particular, the second molded part 18A is held in place by the lid part 25 of the housing 2.

The first molded part 17A and the second molded part 18A are connected to the third molded part 27. The third molded part 27 is installed at the base portion 19 in the region of the evaporator 3. The casing 16 thereby forms an air duct representing the entire first air circuit inside the air conditioning unit 1. Since the evaporator 3 is not intended to be replaceable as it is the case with the fan arrangements 5 and 6, the third molded part 27 remains the same in both the first and the second embodiment of the air conditioning unit 1. Each of the first molded part 17A, the second molded part 18A and the third molded part 27 is formed of expanded polypropylene.

At the rear side of the air conditioning unit 1 a condenser 4 is arranged. The condenser 4 is enclosed by the condenser housing 30. The condenser housing 30 is also made of expanded polypropylene and is open at its front and rear side allowing air to pass through. The front opening 31 is round in shape in order to match with the impeller 11A (second impeller of the first fan arrangement). The condenser is cooled by ambient air which is sucked through the first air vents 22 and guided to the condenser 4 by the second fan 10A of the first fan arrangement 5. The second fan 10A is driven by the common motor 13. Hot air is discharged through the second air vents 23 and guided back into the environment.

Figure 3:
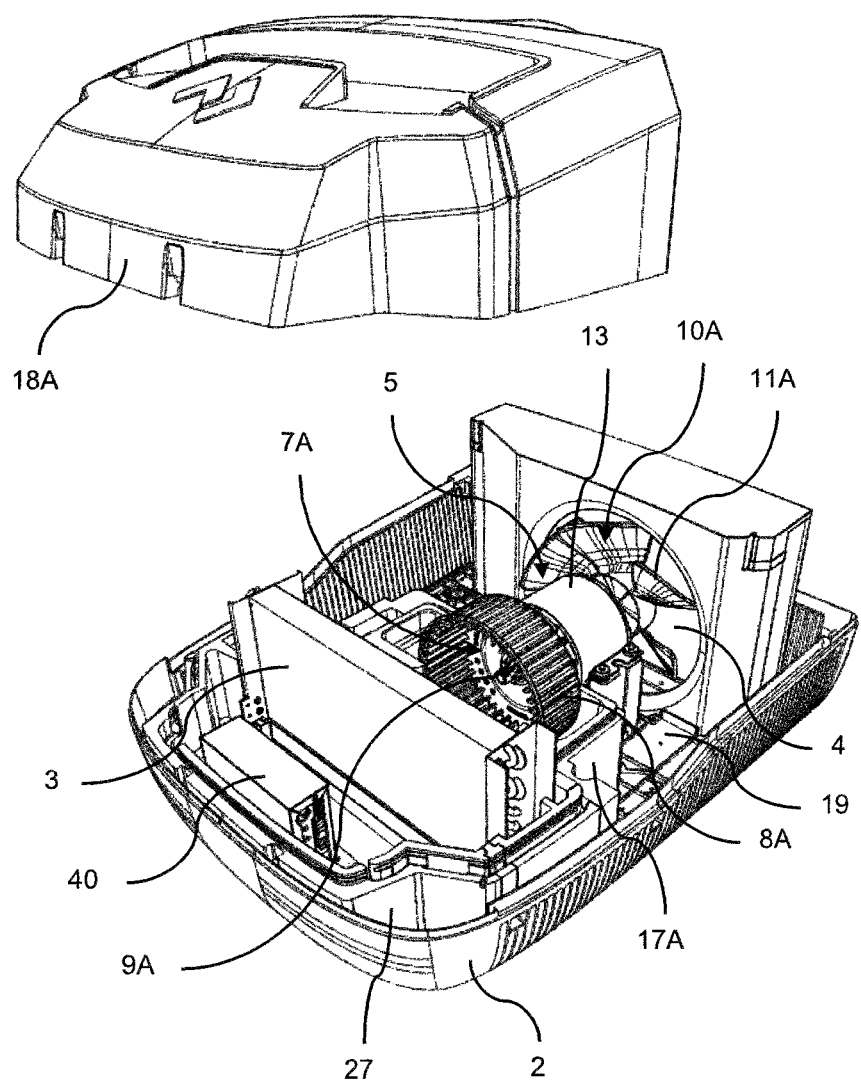
FIG. 3 shows an exploded view of the air conditioning unit shown in FIG. 2.

In FIG. 3. the second molded part 18A is lifted upwards. Thereby the interior of the casing 16 is visible. As mentioned above, the casing 16 forms the first air circuit and, thus, contains the evaporator 3 of the air conditioning unit 1 that cools down the vehicle interior air. The air flow in the first air circuit is generated by the first fan 7A of the first fan arrangement 5. The first fan 7A includes the first impeller 8A and the first shaft 9A about which the first impeller 8A rotates by the driving force of the common motor 13. The first impeller 8A of the first fan arrangement 5 is enclosed by the casing 16. In particular the first impeller 8A is enclosed by the first and second molded parts 17A and 18A of the casing 16.

The first fan 7A of the first fan arrangement 5 is a centrifugal fan that discharges air in a radial direction with respect to the axis of rotation of the fan. The second fan 10A of the first fan arrangement 5 is an axial fan. As mentioned above, both the first fan 7A and the second fan 10A of the first fan arrangement 5 are driven together by the common motor 13. The common motor 13, the first fan 7A and the second fan 10A together form the first fan arrangement 5 with which the air conditioning unit 1 is equipped.

Figure 4:
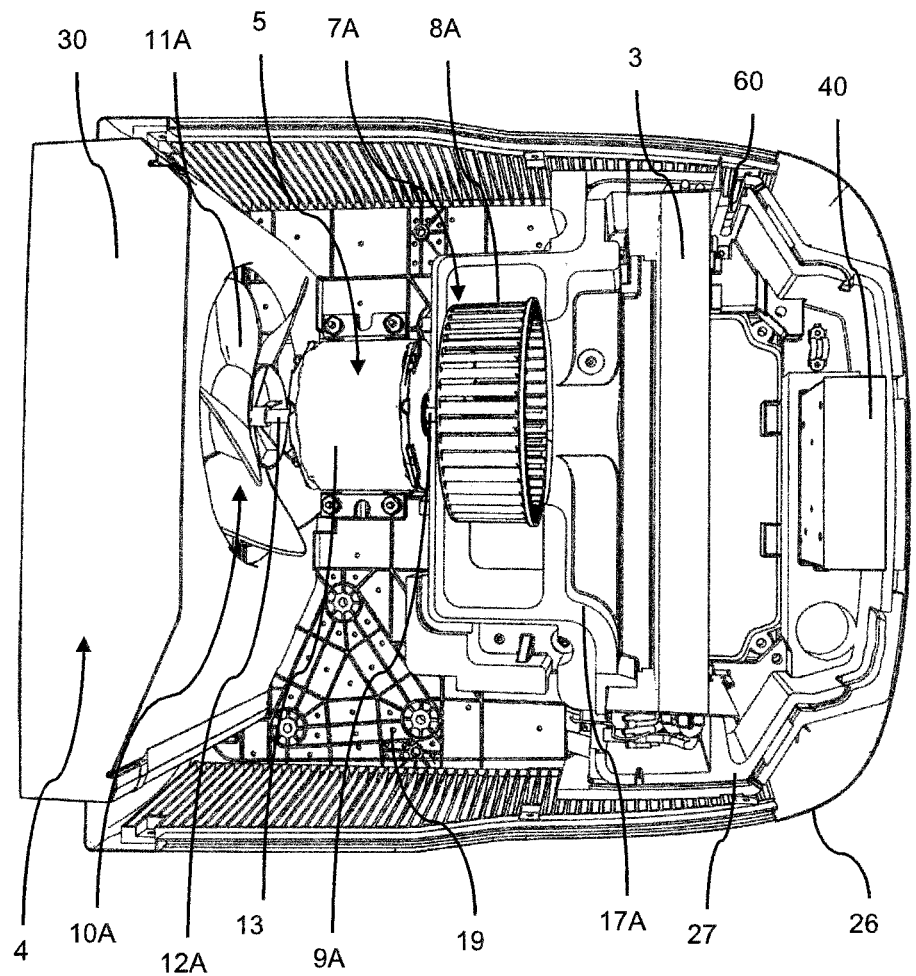
FIG. 4 shows a top view inside the air conditioning unit shown in FIGS. 2 and 3.

FIG. 4 represents a kind of a floor plan of the base part 26 of the housing 2. Here, it can be identified that the first shaft 9A and the second shaft 12A of the first fan arrangement 5 are arranged colinear with respect to each other. The common motor 13 is fixed to the base portion 19 of the base part 26. The base part 26 is equipped with several threaded bores for fixing the multiple components. For a better overview, a number said components that are not in close context with the present embodiments are not shown in the figures, which is the reason why some fixing means on the base portion are unoccupied and visible in the figures.

Further in FIG. 4, the upper edge of the first molded part 17A of the casing 16 can be identified. The first shaft 9A reaches through the connection area between the first molded part 17A and the second molded part 18A of the casing 16. Thus, the first impeller 8A is completely enclosed within the first air circuit. Also integrated into the first air circuit is an electronic control unit 40. The electronic control unit 40 is particularly located upstream the evaporator 3 near the inlet for the interior vehicle air. This ensures a constant and moderate temperature for the control unit 40.

Figure 5:
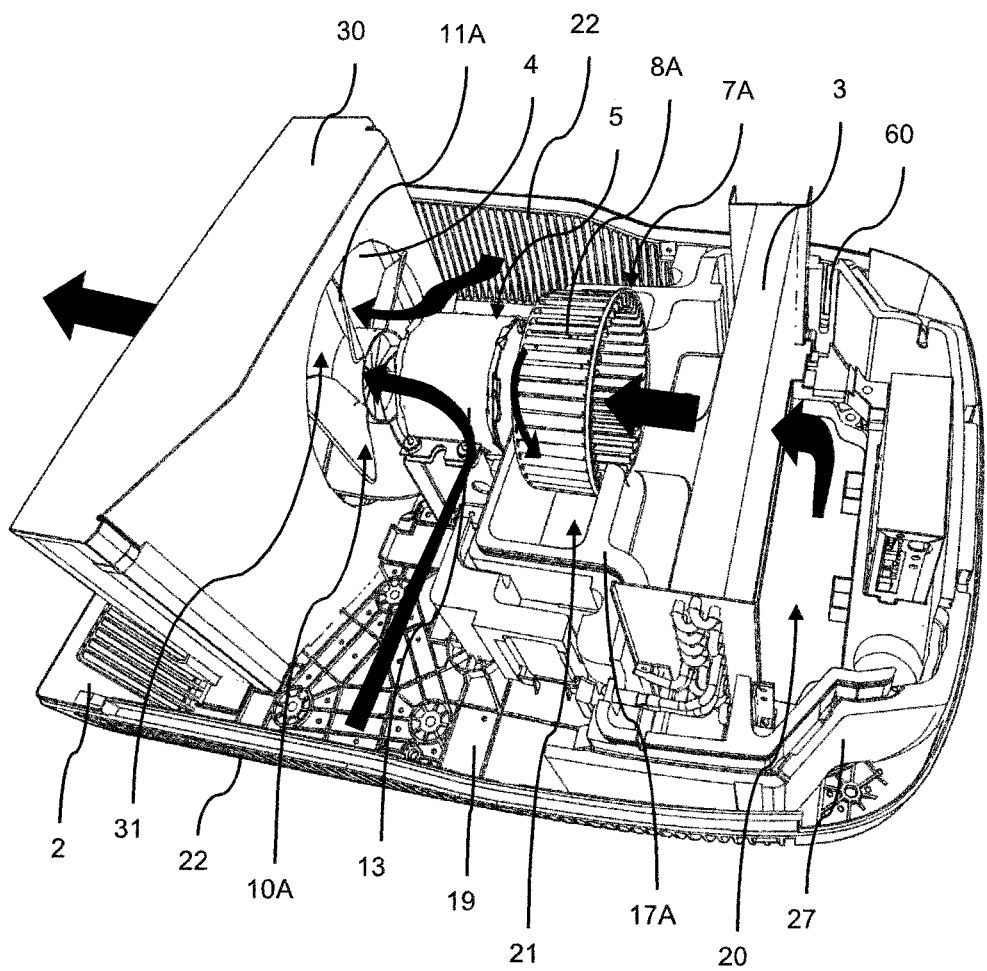
FIG. 5 shows a perspective view of the air conditioning unit shown in FIGS. 2 to 4 illustrating the working principle.

In FIG. 5 the air flow in the first and second air circuits is illustrated by arrows. With regard to the interior air of the vehicle, the air enters the first air circuit through the first opening 20 and flows around and passes by the evaporator 3. Now, the coolant in the evaporator 3 is heated up and evaporates, thereby extracting thermal energy from the air, which consequently cools down. The first fan 7A then takes in the cooled air axially and discharges the air in the radial direction through the blades of the first impeller 8A. In order to avoid a mixing of the discharge air and the intake air again, the air duct formed by the first molded part 17A and the second molded part 18A fits with the circumferential edge of the first impeller 8A at the air intake side, meaning the distal end of the first impeller 8A with respect to the common motor 13. After being radially discharged by the first fan 7A, the air is guided downwards and is fed through the second opening 21 back into the interior of the vehicle.

With regard to the ambient air, the ambient air enters the second air circuit through the first air vents 22 on both lateral sides of the air conditioning unit 1. The ambient air is guided to the second fan 10A of the first fan arrangement 5. The second impeller 11A fits into the front opening 31 of the condenser housing 30 in order to effectively and efficiently force the ambient air to flow around the condenser 4. In the condenser 4, the vaporous coolant is cooled down by the ambient air and condenses, and the air in turn is heated up. The heated air is finally discharged back into the environment via the second air vents 23 located being at the rear side of the air conditioning unit 1.

Figure 6:
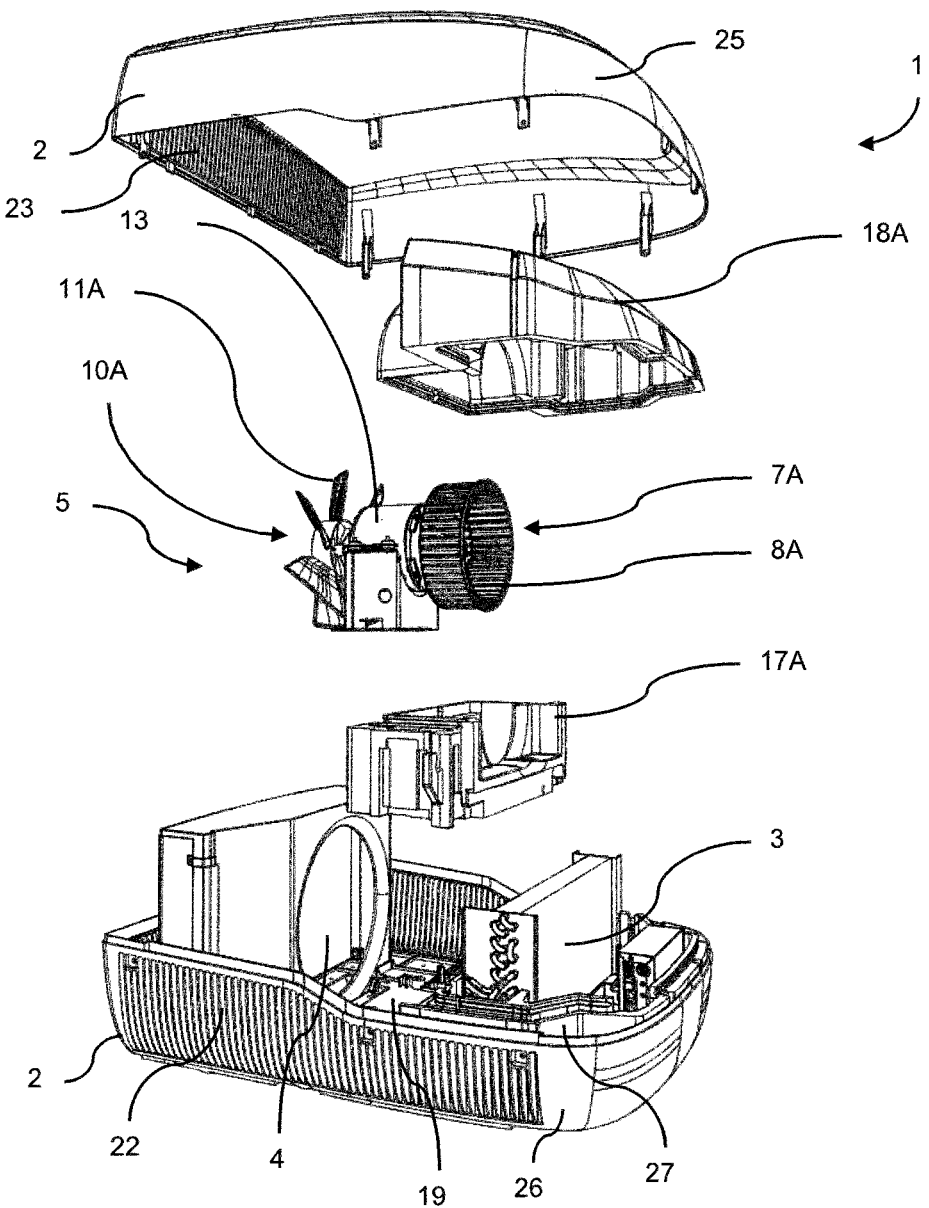
FIG. 6 shows an exploded view of the air conditioning unit shown in FIGS. 2 to 5.

In FIG. 6 the assembly of the first fan arrangement 5 with the first molded part 17A and the second molded part 18A of the casing 16 is illustrated. As such, when installing the first fan arrangement 5 into the air conditioning unit 1, the first molded part 17A is mounted to the base portion 19 of the housing 2 inside the air conditioning unit 1. Next, the first fan arrangement 5 is mounted to the base portion 19. Thereby, the first impeller 8A of the first fan 7A fits into a cavity of the first molded part 17A. Finally, the second molded part 18A is placed from above onto the first molded part 17A and the third molded part 27. The second molded part 18A, thus, is a cover that finally establishes the first air circuit as the casing 16 is formed. The second molded part 18A has a cavity enclosing the upper part of the first impeller 8A of the first fan 7A of the first fan arrangement 5.

When the mounting is completed, the lid part 25 of the housing 2 is placed onto the base part 26 of the housing 2, thereby closing the air conditioning unit 1. The lid part 25 secures the second molded part 18A from being moved upwards and, thus, keeps the casing 16 together.

FIG. 6 further illustrates the exchangeability of the fan arrangement that is installed in the air conditioning unit 1.

Figure 7:
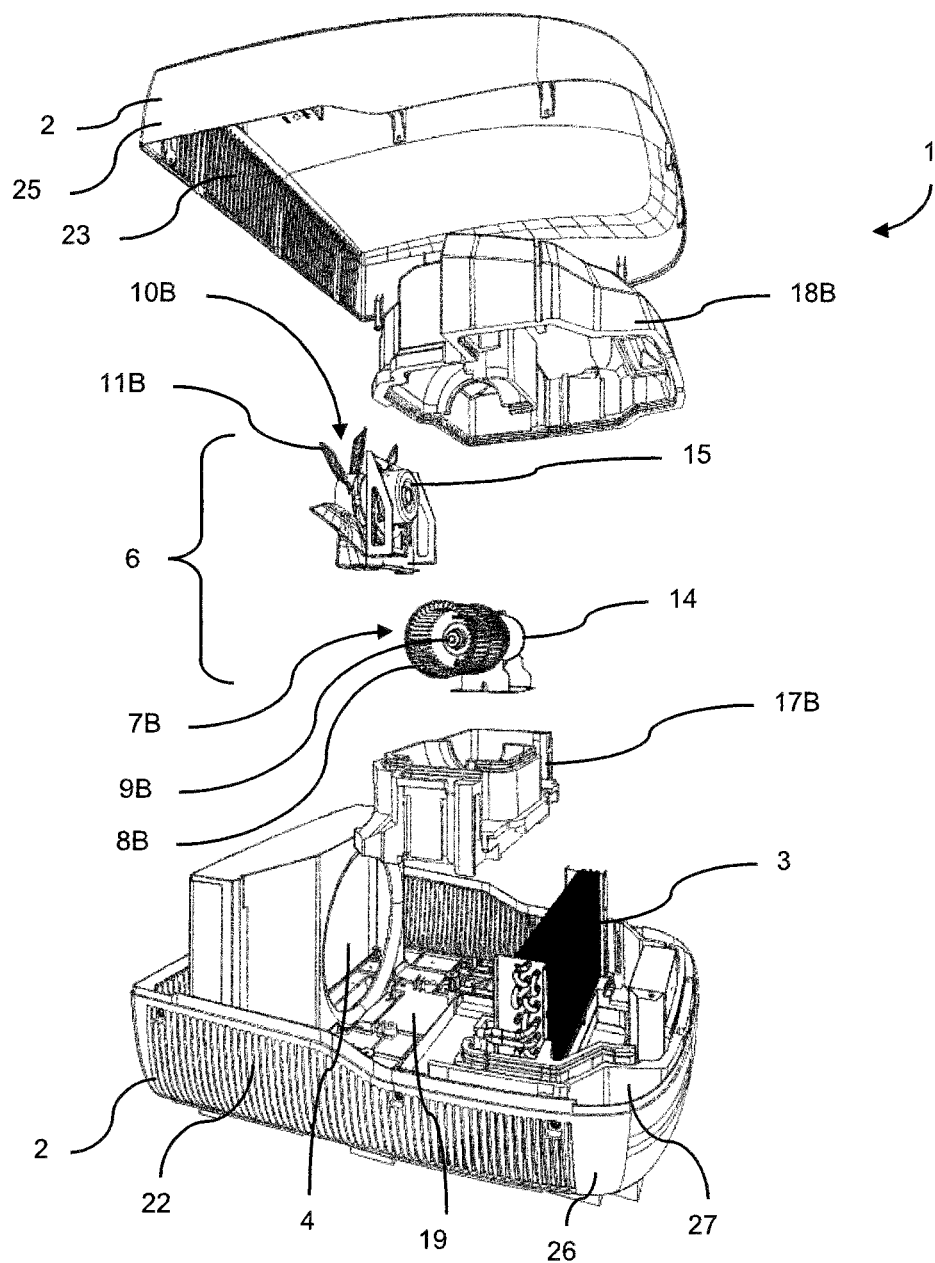
FIG. 7 shows an exploded view of the air conditioning unit according to a second embodiment.

The first fan arrangement 5 having a common motor 13 for both the first and the second fan 7A and 10A may not have enough power, may have not enough performance or may be too loud in the opinion of the user. The user, therefore, has the possibility, instead of referring to and achieving an entirely new air conditioning unit, to dismount the first fan arrangement 5 and to kind of upgrade the air conditioning unit 1 by installing another fan arrangement having different characteristics and performance which fulfill the user's needs. An example of such an upgrade fan arrangement having different characteristics and performance is the second fan arrangement 6, the assembly of which is illustrated in FIG. 7.

The second fan arrangement 6 includes the first fan 7B and the second fan 10B. In the second fan arrangement each of the first fan 7B and the second fan 10B is equipped with a separate motor, while the first motor 14 drives the first fan 7B and the second motor 15 drives the second fan 10B. The first and the second motors 14 and 15 are controlled separately and can, thus, be driven more effectively and efficiently according to the circumstances and user's needs.

In analogy to the first fan arrangement 5, the first fan 7B of the second fan arrangement 6 is designated to generate an air flow in the first air circuit in order to enhance an exchange of thermal energy between the air flowing in the first air circuit and the evaporator 3. Therefore, the isolating casing 16 encloses the first impeller 8B of the first fan 7B of the second fan arrangement 6.

Assembling the second fan arrangement 6 also works analogously to the first fan arrangement 5. After the removable components of the first fan arrangement 5 and its casing 16, as illustrated in FIG. 6, have been removed, the first and second molded parts 17B and 18B and the second fan arrangement 6 are installed by mounting the first molded part 17B to the base portion 19 of the base part 26 of the housing 2 inside the air conditioning unit 1. Next, the second fan 10B is mounted together with the second motor 15 of the second fan arrangement 6 to the base portion 19. The first fan 7B of the second fan arrangement 6 is mounted together with the first motor 14 as a whole in a cavity of the first molded part 17B. Finally, the second molded part 18B is placed from above onto the first molded part 17B and the third molded part 27. The second molded part 18B, thus, acts as a cover that finally establishes the first air circuit as the casing 16 is formed. The second molded part 18B has a cavity enclosing the upper part of the first impeller 8B of the first fan 7B and for the first motor 14 of the second fan arrangement 6.

When the mounting is completed, the lid part 25 of the housing 2 is placed onto the base part 26 of the housing 2, thereby closing the air conditioning unit 1. The lid part 25 thereby secures the second molded part 18B from being moved upwards and, thus, keeps the casing 16 together.

Figure 8:
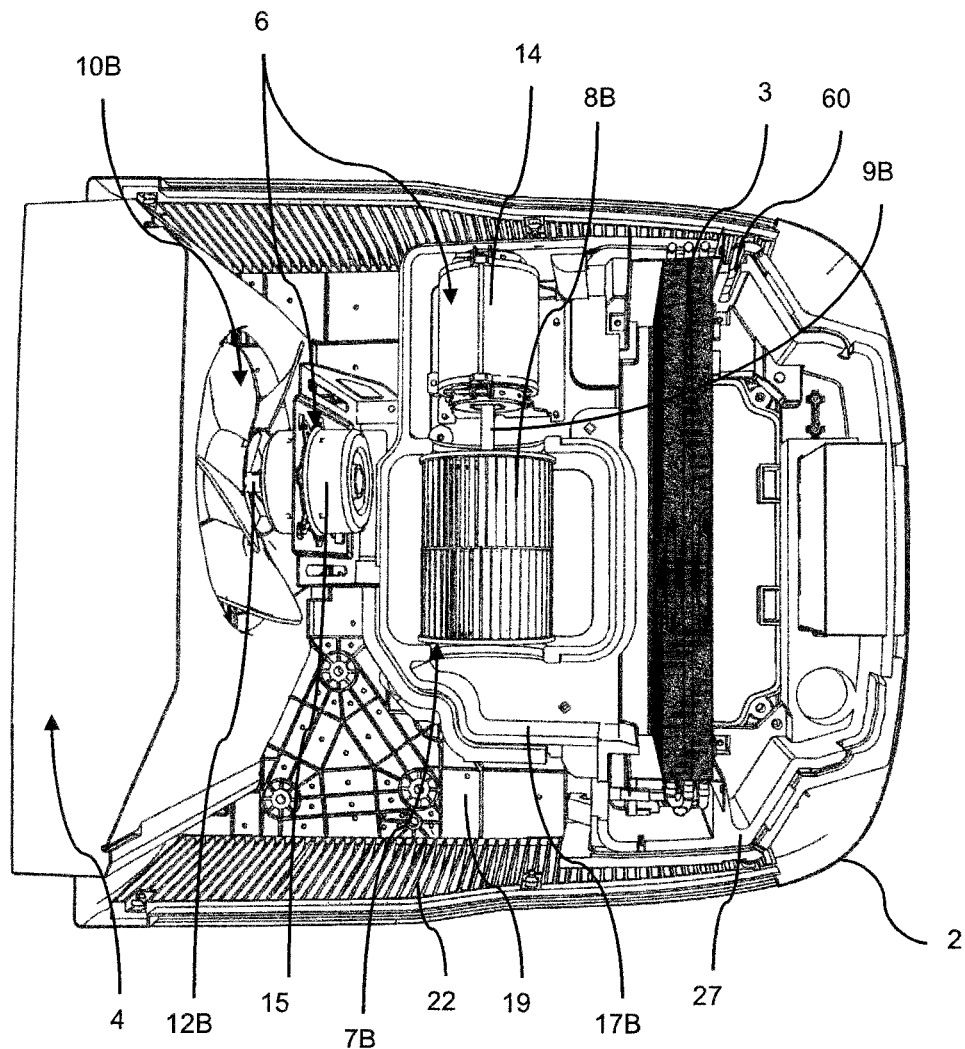
FIG. 8 shows a top view inside the air conditioning unit shown in FIG. 7.

In analogy to FIG. 4 a perspective floor plan of the base part 26 of the housing 2 according to the second embodiment of the air conditioning unit 1 is illustrated in FIG. 8. In the second embodiment of the air conditioning unit 1 the second fan arrangement 6 is installed. As mentioned above, the second fan arrangement 6 is composed of two separate components, one of which includes the first fan 7B and the first motor 14, which component is entirely enclosed by the casing 16. The motor 14 is mounted via a mounting plate on an area of the first molded part 17B inside the first air circuit. The first fan 7B or, respectively, the first impeller 8B of the first fan 7B is a centrifugal fan that sucks air in an axial direction from both sides, the distal end side and the proximal end side of the first impeller 8B with respect to the motor. At these locations, the first and second molded parts 17B and 18B are formed in that the air that is discharged from the first impeller 8B in the radial direction does not mix again with the air previously sucked in.

The second fan 10B of the second fan arrangement 6 is quite similar to the second fan 10A of the first fan arrangement 5 except that it equipped with a separate motor, namely the second motor 15. The second fan 10B and the second motor 15 form the other one of the two separate components of the second fan arrangement 6. The second motor 15 is fixed to a mounting bracket that is mounted on the base portion 19.

Figure 9:
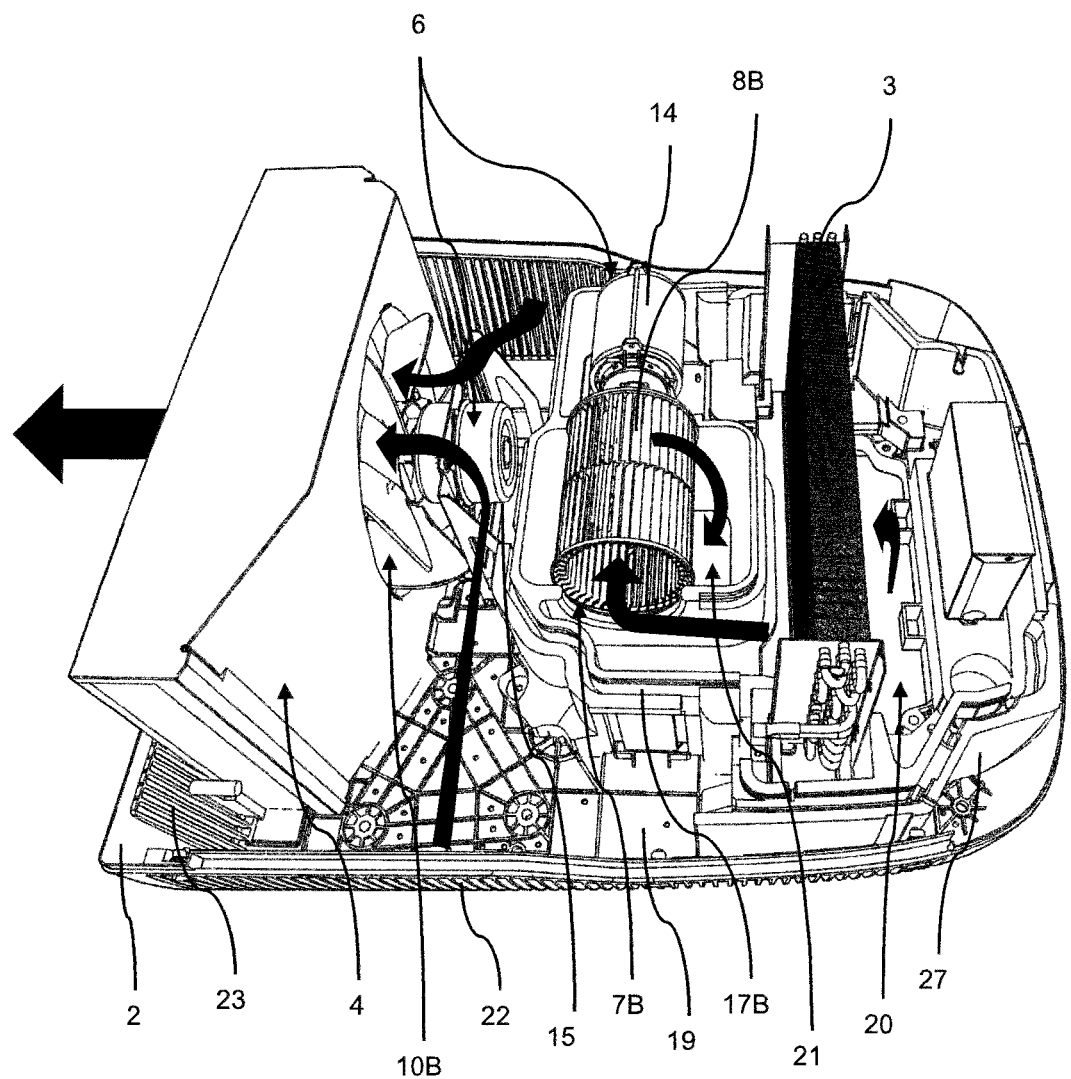
FIG. 9 shows a perspective view of the air conditioning unit shown in FIGS. 7 and 8 illustrating the working principle.

FIG. 9 illustrates by arrows the air flowing through the first and second air circuits when the air conditioning unit 1 is running With regard to the ambient air, the air flow is equivalent to that of the first embodiment. The air enters the second air circuit through the first air vents 22 on both lateral sides of the air conditioning unit 1. The air is guided to the second fan 10B of the second fan arrangement 6. The second impeller 11B fits into the front opening 31 of the condenser housing 30 in order to effectively and efficiently force the air to flow around the condenser 4. The heated air that is heated up by the condenser is finally discharged back into the environment via the second air vents 23 at the rear side of the air conditioning unit 1.

With regard to the interior air of the vehicle, the air enters the first air circuit through the first opening 20 and flows around and passes by the evaporator 3. Thereby thermal energy is extracted from the air, and consequently the air cools down. The first fan 7B then takes in the cooled air axially from both sides, as explained above. The air is discharged in the radial direction through the blades of the first impeller 8B. In order to avoid a mixing of the discharge air and the intake air again, the air duct formed by the first molded part 17B and the second molded part 18B fits with the circumferential edge of the first impeller 8B at both air intake sides of the first impeller 8B, meaning the distal end and the proximal end of the first impeller 8A with respect to the first motor 14. After being discharged in the radial direction by the first fan 7B, the air is guided downwards and is fed through the second opening 21 back into the vehicle.

Figure 10:
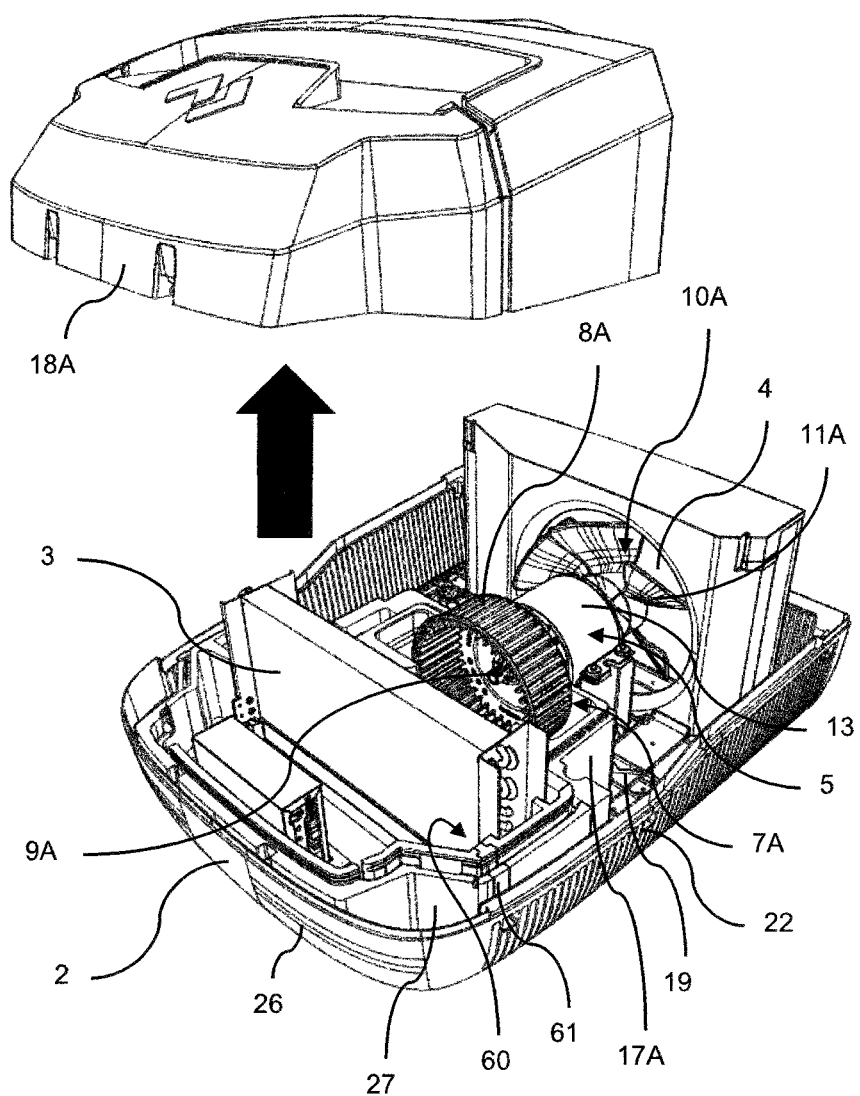
FIG. 10 illustrates a step of removing a component of the air conditioning unit according to the first embodiment.
Figure 11:
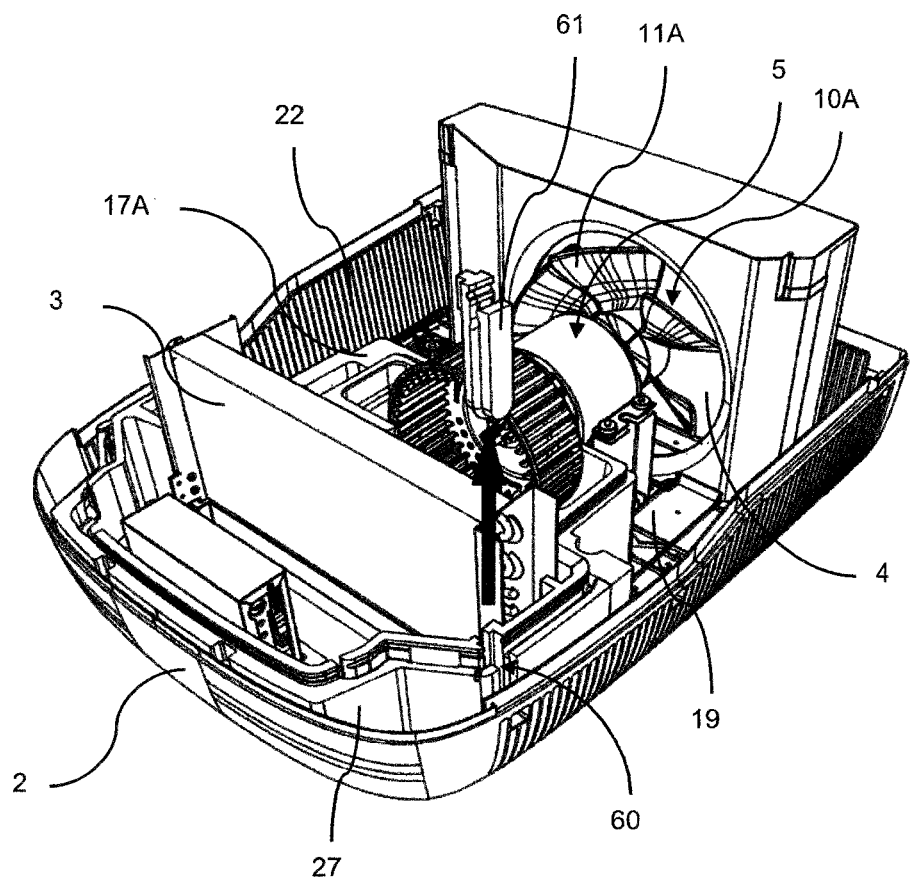
FIG. 11 illustrates a step of removing a further component of the air conditioning unit subsequently to the step shown in FIG. 10.

The air conditioning unit 1 according to the first embodiment is illustrated in FIG. 10, wherein FIGS. 10 to 16 illustrate the installation of a connection hub 50. As a first step of the installation, the second molded part 18A is removed. This exposes the first air circuit. In a wall part of the third molded part 27, a cover insert 61 is located and arranged to cover a cutout region 60. The cutout region 60 can be best seen in FIGS. 4, 5 and 8, in which the cover insert 61 is not shown. As shown in FIG. 11, the cover insert 61 is removed from the cutout region 60, here by lifting it in an upwards direction. The respective insertion and removal of the cover insert 61 into and from the cutout region 60 is assisted by guiding rails and grooves formed at the respective parts. The cover insert 61 is formed of an expanded polypropylene material as well.

Figure 12:
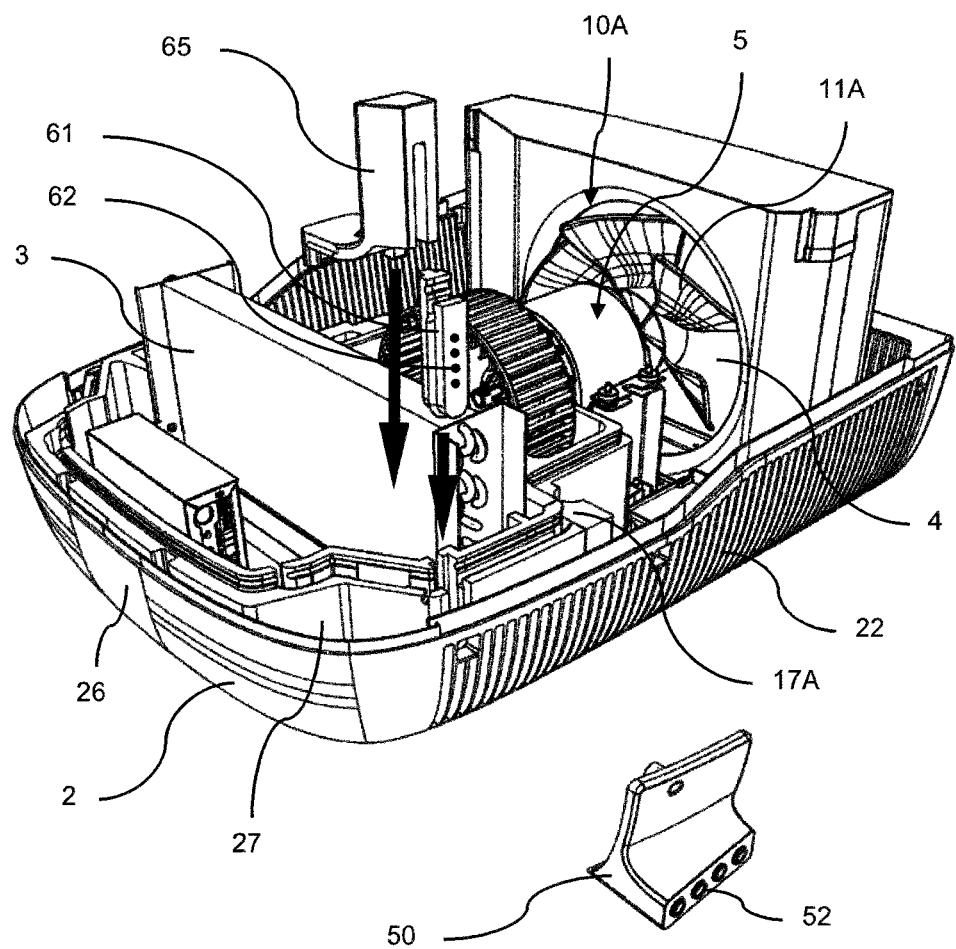
FIG. 12 illustrates a step of adding components of the air conditioning unit subsequently to the step shown in FIG. 11.

As illustrated in FIG. 12, as a next step another cover insert 61 of different shape is reinserted into the cutout region 60. This particular cover insert 61 has through holes 62. The through holes 62 are intended for routing cables through the cover insert 61 from the exterior to the interior of the air conditioning unit 1. The through holes 62 are equipped with a rubber gasket to provide for a sealing. Thus, no air leaks out the first air circuit.

Adjacent to the cover insert 61, a cable guiding part 65 is placed inside the air duct of the first air circuit formed by the third molded part 27, after the cables (not shown) are installed. The cable guiding part 65 protects the cables from damage and prevents the cables from moving around caused by the air flow and vibrations. The cables (not shown) are routed to the outside via the air vents 22 at the side of the base part 26 of housing 2.

Figure 13:
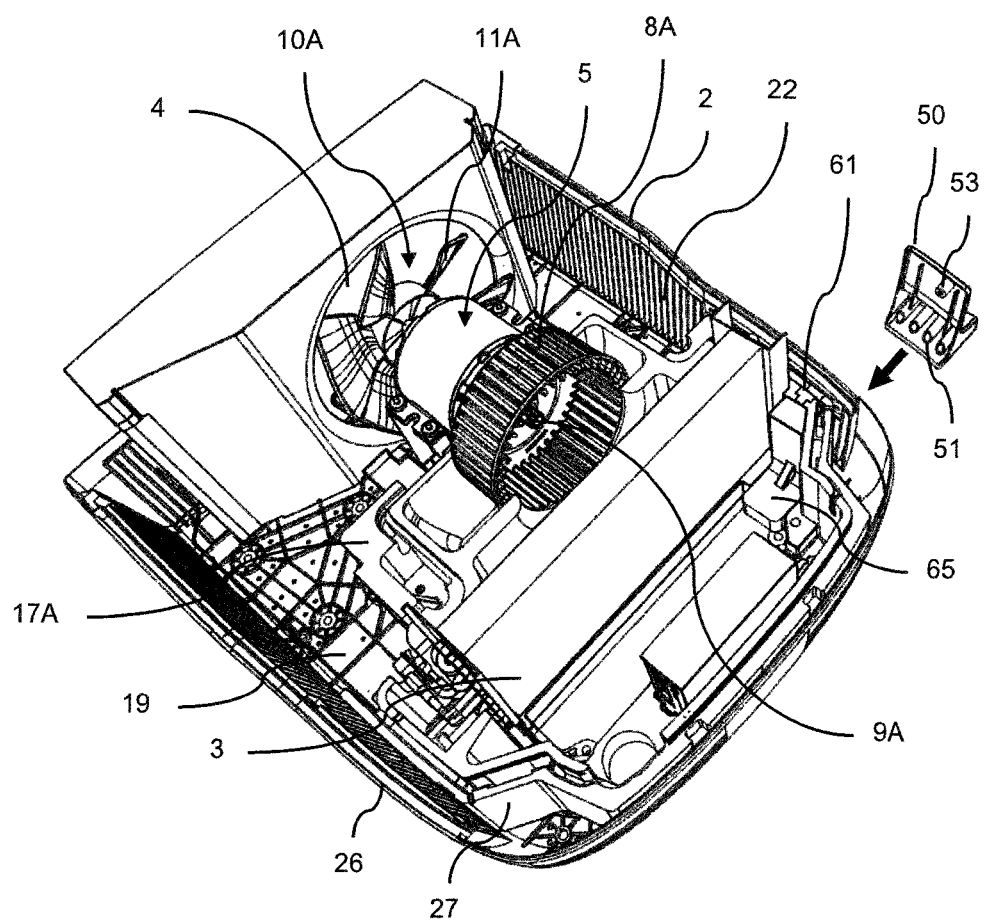
FIG. 13 illustrates a step of adding a further component of the air conditioning unit subsequently to the step shown in FIG. 12.

The connection hub 50 has four ports 52 configured and designed to receive the cables therethrough, as can be identified best in FIG. 13. Each port 52 is connected to a cable duct 51 that guides the cable from the port 52 to the air vents 22 in the housing 2. The cable ducts 51 have a distance to each other so that each cable duct 51 is directed towards a slot of the air vents 22. In the mounting step illustrated in FIG. 13, the connection hub is being attached and fixed to the housing via the connection means 53, which then turns out as shown in FIG. 14. The cables (not shown) are now guided, for example, from the inside of the vehicle, through the first opening 20, then guided by the cable guiding part 65 to the through holes 62 in the cover insert 61 and via the air vents 22, through the cable ducts 51, out from the ports 52 of the connection hub 50. The casing 16 is then closed again by placing the second molded part 18A on the first molded part 17A, as shown in FIG. 15. Finally, the air conditioning unit 1 is closed by the lid part 25 of the housing 2, as shown in FIG. 16.

In FIGS. 17 to 20, while referring again to the first embodiment of the air conditioning unit 1, the mounting of an antenna 80 into the air conditioning unit 1 is illustrated. The second molded part 18A formed of expanded polypropylene has an accommodation area 81 for the antenna 80. The accommodation area 81 is formed in the second molded part 18A on an upper portion of the second molded part 18A. In the accommodation area 81 the antenna 80 is placed, as shown in FIG. 18. The exterior shape of the antenna 80 is thereby adapted to the shape of the accommodation area 81, or vice versa. Thus, the antenna 80 fits into the accommodation area 81. Furthermore, the second molded part 18A has a groove 82 for guiding a cable or a plurality of cables (not shown) of the antenna 80 from the accommodation area 81 to the connection area between the second molded part 18A and the third molded part 27. The cable is guided to the inside of the first air circuit and further through the first opening 20 (not shown here).

The cable or cables (not shown), respectively, are further guided to the inside of the vehicle to an air distribution unit 100, as shown in FIG. 19. The air distribution unit 100 is mounted to the roof 110 inside the vehicle. By the air distribution unit 100 the cooled air can be distributed inside the vehicle via the lateral outlets 102. The lateral outlets are adjustable so that the air distribution can be adapted by the user to his or her needs. Inside the air distribution unit 100, which is hidden by the cover 101, the cable or cables of the antenna 80 can be connected to a signal emitter, for example a WiFi-router (not shown). The air distribution unit 100 covered by the cover 101 has a mounting area (not shown) for mounting the signal emitter. Furthermore, the signal emitter is connected to the power source of the vehicle for the air conditioning unit 1 for receiving electrical power.

FIG. 20 finally illustrates the readily assembled air conditioning system, including the air conditioning unit 1 closed again by the lid part 25 of the housing 2 and the air distribution unit 100 from a side and mounted to the roof 110 of a vehicle.

It is to be noted that in the afore-said reference has been made to the first embodiment of the air conditioning unit 1 when describing the features if the connection hub 50 and/or the antenna 80 wherein these features work with the second embodiment of the air conditioning unit 1 as well and in the same manner as described with the first embodiment.

REFERENCE NUMERALS

1 Air conditioning unit
2 housing
3 evaporator
4 condenser
5 first fan arrangement
6 second fan arrangement
7A first fan of first fan arrangement
7B first fan of second fan arrangement
8A first impeller of first fan arrangement
8B first impeller of second fan arrangement
9A first shaft of first fan arrangement
9B first shaft of second fan arrangement
10A second fan of first fan arrangement
10B second fan of second fan arrangement
11A second impeller of first fan arrangement
11B second impeller of second fan arrangement
12A second shaft of first fan arrangement
12B second shaft of second fan arrangement
13 common motor
14 first motor
15 second motor
16 casing
17A first molded part for first fan arrangement
17B first molded part for second fan arrangement
18A second molded part for first fan arrangement
18B second molded part for second fan arrangement
19 base portion
20 first opening
21 second opening
22 first air vents
23 second air vents
24 connection area
25 lid part of housing
26 base part of housing
27 third molded part
30 condenser housing
31 front opening
40 control unit
50 connection hub
51 cable ducts
52 port
53 connection means
60 cutout region
61 cover insert
62 through holes
65 cable guiding part
80 antenna
81 accommodation area
82 groove
100 air distribution unit
101 cover
102 outlet of air distribution unit
110 roof

The invention claimed is:

1. An air conditioner configured to be mounted on a vehicle, comprising: an antenna connected to an antenna cable that is removably installed in the air conditioner;
wherein the air conditioner comprises a housing that spatially separates an interior of the air conditioner from the environment and that the antenna is arranged inside the housing;

wherein the air conditioner comprises a casing inside the housing, the casing forming an air duct serving as at least a portion of a first air circuit inside the air conditioner, and the antenna is arranged between the casing and the housing.

2. The air conditioner of claim 1, wherein the casing has an accommodation area for the antenna at an outer surface of the casing, the accommodation area being shaped to match the form of the antenna so as to accommodate the antenna.

3. The air conditioner of claim 1, wherein the casing has a guiding portion at an outer surface of the casing for guiding the antenna cable.

4. The air conditioner of claim 1, wherein the casing is formed of a plastic foam material.

5. The air conditioner of claim 1, wherein the air conditioner includes the antenna.

6. The air conditioner of claim 5, wherein the antenna is included in an assembled component that further includes a signal emitter and the antenna cable is a power cable.

7. The air conditioner of claim 6, wherein the power cable is connected to a power supply provided inside the air conditioner.

8. An air conditioning system for a vehicle comprising an air conditioner and an air distribution box that is configured to be mounted internally in the vehicle and to be connected to the air conditioner so as to distribute conditioned air from the air conditioner inside the vehicle, wherein the air distribution box is configured to receive an antenna cable;
wherein the air distribution box comprises a mounting area for mounting a signal emitter and the air distribution box is configured such that the signal emitter is connected with the antenna cable.

9. The air conditioning system of claim 8, wherein the mounting area comprises snap-in elements by which the signal emitter is mounted to the mounting area.

10. The air conditioning system of claim 8, wherein the air distribution box comprises a removable cover covering the mounting area.

11. The air conditioning system of claim 8, wherein the air conditioning system includes the signal emitter.

12. The air conditioning system of claim 8, wherein in a mounted state, the air conditioner is connected to a power supply, wherein an antenna and the signal emitter is connected to the power supply of the air conditioner as well.

13. The air conditioning system of claim 8, wherein the air conditioning system comprises a controller, wherein the antenna and the signal emitter is controlled by the controller of the air conditioning system.

\* \* \* \* \*